US009036059B2

United States Patent
Takano

(10) Patent No.: US 9,036,059 B2
(45) Date of Patent: May 19, 2015

(54) IMAGING APPARATUS FOR EFFICIENTLY GENERATING MULTIPLE FORMS OF IMAGE DATA OUTPUT BY AN IMAGING SENSOR

(75) Inventor: Hiroshi Takano, Kanagawa (JP)

(73) Assignees: Sony Corporation, Tokyo (JP); Sony Mobile Communications, Inc., Tokyo (JP)

( * ) Notice: Subject to any disclaimer, the term of this patent is extended or adjusted under 35 U.S.C. 154(b) by 78 days.

(21) Appl. No.: 13/588,284

(22) Filed: Aug. 17, 2012

(65) Prior Publication Data
US 2013/0208153 A1 Aug. 15, 2013

Related U.S. Application Data

(60) Provisional application No. 61/554,121, filed on Nov. 1, 2011.

(51) Int. Cl.
H04N 9/09 (2006.01)
H04N 9/04 (2006.01)

(52) U.S. Cl.
CPC . *H04N 9/045* (2013.01); *H04N 9/09* (2013.01)

(58) Field of Classification Search
CPC ....... H04N 5/335; H04N 9/045; H04N 5/332; H04N 9/09
USPC .................................. 348/266, 278–280, 265
See application file for complete search history.

(56) References Cited

U.S. PATENT DOCUMENTS

| 7,864,226 | B2 | 1/2011 | Asada |
| 8,228,417 | B1* | 7/2012 | Georgiev et al. ............... 348/340 |
| 2006/0187338 | A1* | 8/2006 | May et al. ...................... 348/375 |
| 2007/0091338 | A1 | 4/2007 | Asada |
| 2009/0002505 | A1 | 1/2009 | Imada |
| 2009/0079834 | A1 | 3/2009 | Otsu |
| 2010/0097491 | A1 | 4/2010 | Farina et al. |
| 2010/0208100 | A9* | 8/2010 | Olsen et al. ................. 348/227.1 |
| 2011/0193996 | A1* | 8/2011 | Onoda et al. ............. 348/231.99 |
| 2013/0229540 | A1 | 9/2013 | Farina et al. |

FOREIGN PATENT DOCUMENTS

| CN | 1457609 A | 11/2003 |
| CN | 1953503 A | 4/2007 |
| EP | 2 001 222 A2 | 12/2008 |

(Continued)

OTHER PUBLICATIONS

Extended European Search Report issued Oct. 4, 2013, in European Patent Application No. 12187513.2.

(Continued)

*Primary Examiner* — Mekonnen Dagnew
(74) *Attorney, Agent, or Firm* — Oblon, McClelland, Maier & Neustadt, L.L.P.

(57) ABSTRACT

An information processing apparatus comprising: a sensor unit including a plurality of sensor arrays that output first imaging data formed by an optical system; an array converter that generates second imaging data by converting the first imaging data output by the sensor unit into an order corresponding to a predetermined arrangement; a first signal processor that performs first signal processing on the second imaging data output by the array converter; and a second signal processor that performs second signal processing on the first imaging data output by the sensor unit.

16 Claims, 13 Drawing Sheets

(56) References Cited

FOREIGN PATENT DOCUMENTS

| EP | 2 001 222 A9 | 12/2008 |
| EP | 2 180 714 A2 | 4/2010 |
| JP | 2000-341706 | 12/2000 |
| JP | 2007-089219 | 4/2007 |
| WO | WO 2006/039486 A2 | 4/2006 |

OTHER PUBLICATIONS

Combined Chinese Office Action and Search Report issued Jun. 20, 2014 in Patent Application No. 201210385687.6 (with English language translation).

* cited by examiner

|  | 1-CHIP BAYER ARRAY | 3-CHIP R, G, B | 3-CHIP R, G, B + ARRAY CONVERSION |
|---|---|---|---|
| IMAGE QUALITY | FAIR | GOOD | GOOD |
| GENERAL SYSTEM AFFINITY | GOOD | POOR | FAIR |
| REUSABILITY WITH VIEWFINDER MODE FUNCTION | GOOD | FAIR | GOOD | ated by combining the three
IMAGING APPARATUS FOR EFFICIENTLY GENERATING MULTIPLE FORMS OF IMAGE DATA OUTPUT BY AN IMAGING SENSOR

CROSS REFERENCE TO RELATED APPLICATION

The present application claims the benefit of the earlier filing date of U.S. Provisional Patent Application Ser. No. 61/554,121 filed on Nov. 1, 2011, the entire contents of which is incorporated herein by reference.

BACKGROUND

1. Field of the Disclosure

The present disclosure relates to an imaging apparatus able to form an image of a subject on an image sensor, and from the imaging data output from that image sensor save, to a storage medium, image data to be displayed on a display screen.

2. Description of Related Art

In digital cameras widely available today, a color filter is disposed in front of a one-chip image sensor for imaging, in which respective filters for the three primary colors red (R), green (G), and blue (B) are arranged in an order called a Bayer arrangement, for example, and with the cameras being configured such that an image of a subject given by a lens system is formed on the one-chip image sensor via the color filter.

Additionally, such digital cameras are configured to be able to generate image data for display on a display screen and image data to be saved to a storage medium from the respective R, G, and B imaging data output from the one-chip image sensor, or in other words the respective R, G, and B imaging data output in a given order such as the Bayer arrangement.

Meanwhile, as discussed above, configurations that dispose the color filter in front of the one-chip image sensor are widely prevalent in digital cameras today. For this reason, the handling of respective R, G, and B imaging data output in a given order such as the Bayer arrangement has been generalized in systems presuming such, even in signal processing systems which are disposed behind the one-chip image sensor and which receive the output of the one-chip image sensor to generate the display or other image data.

Other conventional technology besides the above is given by Japanese Unexamined Patent Application Publication No. 2007-89219 (PTL 1), for example, which discloses an imaging apparatus able to conduct imaging by appropriately selecting between a still image with high definition image quality and a motion image with standard image quality. In other words, this publication discloses technology in which, under control by a control system, an image signal for a motion image and an image signal for a still image are output from a single solid-state image sensor, the output is converted into a digital signal, and a standard image quality processing circuit is selected in the case where the imaged image is a motion image, while a high definition image quality processing circuit is selected in the case where the imaged image is a still image. This publication also discloses technology that converts and outputs a motion image signal supplied by selection into a standard image quality signal with the standard image quality processing circuit, and converts and outputs a still image signal supplied by selection into a high definition image quality signal with the high definition image quality processing circuit.

Another conventional technology is given by Japanese Unexamined Patent Application Publication No. 2000-341706 (PTL 2), for example, which discloses an image signal processing apparatus able to obtain three-CCD image sensor output with good precision from one-CCD image sensor output. In other words, this publication discloses technology which makes it possible to compute, by class separation adaptive processing, an image signal equivalent to the CCD image sensor output of a three-chip camera having respective R, G, and B color components for each pixel from the CCD image sensor output of a one-chip camera which outputs a signal in which each pixel is just one color from among the three primary colors R, G, and B.

Also, International Publication Brochure No. 06/039486 (PTL 3) discloses an imaging apparatus using a technique called "Light Field Photography". This imaging apparatus is configured such that a microlens array is disposed at a focal plane given by an imaging lens, and an image sensor is additionally provided at the focal point of the microlens array. Thus, light rays from an object to be imaged are acquired as light vectors which retain information on not only the intensity distribution at the image sensor, but also the travel direction. For this reason, imaging data acquired at the image sensor includes information regarding parallax, and by performing given image processing, it becomes possible to apply the data to 3D display and distance information extraction, for example.

SUMMARY

Meanwhile, the above-discussed format which provides a color filter in which respective R, G, and B filters are arranged in front of a one-chip image sensor is configured such that each pixel on the one-chip image sensor corresponds to one of color filters R, G, or B. For this reason, in the case of this format, there is a flaw in that the spatial resolution for color is lowered with respect to the spatial resolution given by all pixels on the one-chip image sensor.

There do exist digital cameras able to avoid such lowering of the spatial resolution for color, in which three image sensors are provided respectively corresponding to the three colors R, G, and B, for example, and in which incident light passing through the lens system is separated by a dispersive prism into R, G, and B color components which are respectively formed on the image sensors. By combining the three imaging outputs from these three image sensors, a camera image is generated. In other words, since a digital camera provided with such a three-chip image sensor is configured to form incident light separated into R, G, and B color components by a dispersive prism on respectively corresponding image sensors, the spatial resolution corresponding to the individual R, G, and B colors becomes approximately equal to the spatial resolution given by all pixels on each image sensor, and it becomes possible to realize a higher color spatial resolution than that of a digital camera provided with the one-chip image sensor discussed earlier.

However, in the case of a digital camera provided with the three-chip image sensor, imaging data output from the three image sensors becomes imaging data for three images obtained due to the dispersive prism splitting the image formed by the lens system into individual R, G, and B color components. In other words, the images formed on the three respective image sensors are identical images, except the color component is R, G, or B, respectively.

For this reason, a signal processing system which is disposed behind such a three-chip image sensor and which receives the output of each of the three image sensors to generate a color image is different from a signal processing system which is provided behind the one-chip image sensor and which handles imaging data output in a given order such as the Bayer arrangement. Stated differently, whereas a signal processing system that handles imaging data output in a given order such as the Bayer arrangement is general-purpose, a signal processing system provided behind the three-chip image sensor is a system that conducts special signal processing.

Meanwhile, signal processing systems that generate color image data from imaging data output in a given order, such as signal processing systems that handle the output from the one-chip image sensor discussed earlier, are already widely prevalent, and manipulation in software is also easy. For this reason, it is conceivable that if such a versatile signal processing system could be reused in the development of new products, for example, then it would be possible to ease software design and modification, shorten the development period, and curtail rises in costs.

Given the above, the inventor has recognized the need to enable signal processing of imaging data output in the order of a given arrangement, while also enabling signal processing of a plurality of identical images formed due to incident light from a given subject passing through an optical system, for example, to thereby ease software design and modification, shorten the development period, and curtail rises in costs in the development of new products.

According to a first exemplary embodiment, the disclosure is directed to an information processing apparatus comprising: a sensor unit including a plurality of sensor arrays that that output first imaging data formed by an optical system; an array converter that generates second imaging data by converting the first imaging data output by the sensor unit into an order corresponding to a predetermined arrangement; a first signal processor that performs first signal processing on the second imaging data output by the array converter; and a second signal processor that performs second signal processing on the first imaging data output by the sensor unit.

According to another exemplary embodiment, the disclosure is directed to an information processing method performed by an information processing apparatus, the method comprising: outputting, by a sensor unit including a plurality of sensor arrays, first imaging data formed by an optical system; generating second imaging data by converting the first imaging data output by the sensor unit into an order corresponding to a predetermined arrangement; performing, by a first signal processor, first signal processing on the second imaging data; and performing, by a second signal processor, second signal processing on the first imaging data.

According to another exemplary embodiment, the disclosure is directed to a non-transitory computer-readable medium including computer program instructions, which when executed by an information processing apparatus, cause the information processing apparatus to perform a method, the method comprising: outputting, by a sensor unit including a plurality of sensor arrays, first imaging data formed by an optical system; generating second imaging data by converting the first imaging data output by the sensor unit into an order corresponding to a predetermined arrangement; performing, by a first signal processor, first signal processing on the second imaging data; and performing, by a second signal processor, second signal processing on the first imaging data.

In other words, according to an embodiment of the present disclosure, it is configured such that imaging data in the order of a given arrangement is generated from imaging data for a plurality of identical images formed by an optical system, first signal processing is executed on the imaging data in the order of the given arrangement, and second signal processing is executed on imaging data for a plurality of identical images.

According to an embodiment of the present disclosure, it is for example possible to execute second signal processing on imaging data for a plurality of identical images formed due to incident light from a given subject passing through an optical system, and in addition, it is configured such that imaging data in the order of a given arrangement is generated from the imaging data for that plurality of identical images and it is possible to execute first signal processing on the imaging data in the order of a given arrangement, thereby making it possible to ease software design and modification, shorten the development period, and curtail rises in costs in the development of new products, for example.

DETAILED DESCRIPTION

Figure 1:
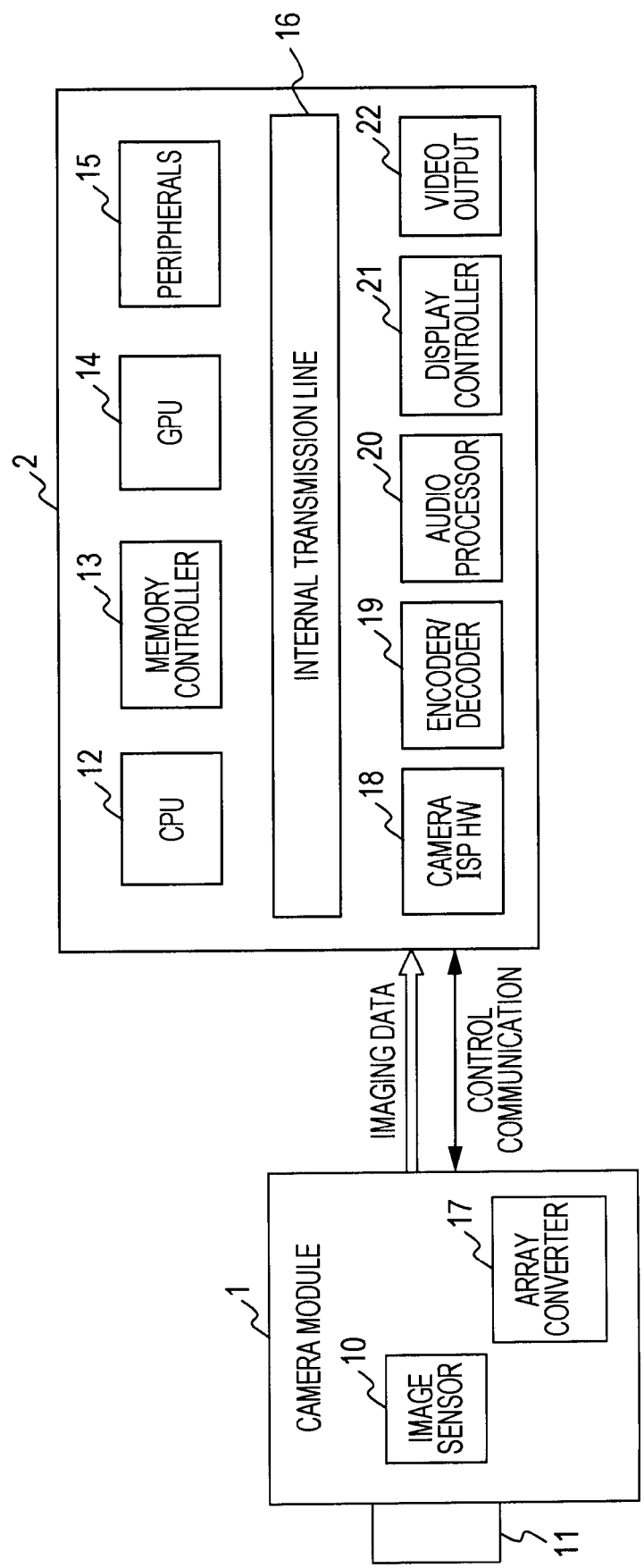
FIG. 1 is a diagram illustrating a schematic block configuration of an imaging apparatus of a first and second embodiment of the present disclosure.

Hereinafter, embodiments of an imaging apparatus, an imaging signal processing method, an imaging signal processing program, and a recording medium upon which an imaging signal processing program is recorded will be described with reference to the drawings as embodiments of the present disclosure.

In the following description, an imaging apparatus which enables signal processing of imaging data output in the order of a given arrangement, such as the Bayer arrangement, for example, while also enabling signal processing of a plurality of identical images formed due to incident light from a given subject passing through an optical system, is given as an exemplary embodiment of the present disclosure.

However, an imaging apparatus of an embodiment of the present disclosure is not only applicable to so-called digital cameras, but also to various electronic devices provided with digital cameras, such as mobile phones and high-performance mobile devices, portable game consoles, portable navigation devices, portable music players, portable digital television receivers, and portable personal computers.

[Overview of Imaging Apparatus of an Embodiment of the Present Disclosure]

An imaging apparatus of a first embodiment of the present disclosure is configured to be able to form respectively identical images on three image sensors by separating incident light passing through the lens system into respective R, G, and B color components with a dispersive prism and respectively resolving them onto three image sensors which respectively correspond to the three colors R, G, and B. Also, an imaging apparatus of a first embodiment of the present disclosure includes an array converter which generates imaging data in the order of a given arrangement, such as the Bayer arrangement, for example, from the imaging data of the three-chip image sensor. Furthermore, an imaging apparatus of a first embodiment of the present disclosure includes a camera image signal processor (ISP) that conducts second signal processing on the imaging data for respectively identical images output from the three image sensors, and a camera ISP that conducts first signal processing on the imaging data which is in the order of a given arrangement and which is output from the array converter.

In the first embodiment of the present disclosure herein, various image data analysis processing such as a process that generates a preview image to be displayed on a viewfinder screen, automatic exposure (AE), auto white balance (AWB), auto focus (AF), what are called face detection and smile detection, scene recognition, noise reduction, and shake detection may be given as examples of the first signal processing performed on imaging data which is in the order of a given arrangement. On the other hand, a process that generates a capture image to be saved to memory or elsewhere may be given as an example of the second signal processing performed on the imaging data for a plurality of identical images given by the three-chip image sensor.

Next, an imaging apparatus of a second embodiment of the present disclosure is configured to separate a one-chip image sensor into individual areas of given size consisting of groups of several pixels each, for example, and a microlens array is provided on the one-chip image sensor with the microlenses respectively positioned in correspondence with each of these areas, such that incident light from a subject passes through the main lens system and is led to the microlens array, where identical images can be formed in each of the individual areas by the microlenses constituting the microlens array. Also, an imaging apparatus of a second embodiment of the present disclosure includes an array converter which generates imaging data in the order of a given arrangement, such as the Bayer arrangement, for example, from the imaging data of the areas. Furthermore, an imaging apparatus of a second embodiment of the present disclosure includes a camera image signal processor (ISP) that conducts second signal processing on the imaging data of the areas, and a camera ISP that conducts first signal processing on the imaging data which is in the order of a given arrangement and which is output from the array converter.

In the second embodiment of the present disclosure herein, various image data analysis processing such as AE, AWB, AF, face detection and smile detection, scene recognition, noise reduction, and shake detection may be given as examples of the first signal processing performed on the imaging data which is in the order of a given arrangement. On the other hand, various signal processing may be given as examples of the second signal processing performed on the imaging data for a plurality of identical images given by the areas, such as a process that generates a capture image which consists of the plurality of identical images given by the areas and which will be saved to memory or elsewhere, light vector calculation, parallax calculation, and 3D distance calculation based on information such as the intensity distribution of light incident on the image sensor and the travel direction of incident light, color gain correction using AWB data given by the first signal processing, a parallax correction process, and a process that generates a preview image to be displayed on a viewfinder screen by combining several identical images, for example.

Meanwhile, in the second embodiment, it is configured such that the amount of imaging data for a plurality of identical images given by the areas which is to be used can be appropriately modified according to various applications, such as when generating a preview image, generating a capture image, or acquiring a motion image, for example. For example, it may be configured such that when generating a preview image, only the imaging data of areas for at least the three color components R, G, and B may be used, for example, whereas the imaging data of all areas may be used when generating a capture image, for example, while when acquiring a motion image, the imaging data of a number of areas corresponding to the requested image size for the motion image may be used, for example.

Otherwise, in the present disclosure, R, G, and B data in the order of a given arrangement is not limited to the Bayer arrangement and may be in another arrangement. Also, the configuration for forming a plurality of identical images is not limited to a configuration provided with the three-chip image sensor or a configuration provided with the microlens array, and may be another configuration.

[Exemplary Schematic Configuration of an Imaging Apparatus of an Embodiment of the Present Disclosure]

FIG. 1 illustrates an exemplary schematic block configuration to which an imaging apparatus of the first and second embodiment of the present disclosure are applied.

In FIG. 1, a camera module 1 is configured to include an optical system 11 that guides incident light from a subject into its interior and forms an image on an image sensor 10, the image sensor 10, and an array converter 17 discussed later.

The optical system 11 is composed of a lens system, a dispersive prism, color filter, etc. in the case of the first embodiment, and of a main lens system, microlens array, color filter, etc. in the case of the second embodiment.

The image sensor 10 includes three image sensors corresponding to respective R, G, and B color components which have been separated by the dispersive prism in the case of the first embodiment, and of a one-chip image sensor disposed in front of the microlens array in the case of the second embodiment.

Also, although discussed in detail later, the array converter 17 is configured to be supplied with the imaging data for a plurality of identical images from the image sensor 10 of the camera module 1, to generate imaging data in the order of a given arrangement, for example, from the imaging data, and to supply that imaging data in the order of a given arrangement to the first camera ISP of a camera ISP 18 in a signal processing system 2 discussed later.

In the camera module 1, various operations are controlled by a control signal supplied from the camera ISP 18 or CPU 12 of the signal processing system 2 discussed later, such as module activation, imaging operation in the image sensor 10, imaging data output operation, and array conversion operation in the array converter 17.

Then, imaging data output from the image sensor 10 of the camera module 1 is sent to the signal processing system 2. When an array conversion process has been executed by the array converter 17, the array-converted imaging data is also sent to the signal processing system 2.

The signal processing system 2 is configured to include a central processing unit (CPU) 12, a camera ISP 18, a memory controller 13, a graphics processing unit (GPU) 14, an encode/decode unit 19, an audio processor 20, a display controller 21, a video output unit 22, and peripheral components 15.

Although discussed in detail later, the camera ISP 18 of the signal processing system 2 is provided with a hardware configuration for fast execution of signal processing, and is configured to include a first camera ISP able to execute first signal processing on imaging data output in the order of a given arrangement such as the Bayer arrangement, for example, and a second camera ISP able to execute second signal processing on the imaging data for a plurality of identical images formed by passing incident light from a subject through an optical system. In other words, in the present embodiment, the first camera ISP is configured to be able to execute various image data analysis processing, such as automatic exposure (AE), auto white balance (AWB), auto focus (AF), what are called face detection and smile detection, scene recognition, noise reduction, and shake detection, for example, on the basis of imaging data which has been put in the order of a given arrangement such as the Bayer arrangement, for example. Also, the second camera ISP is configured to be able to execute second signal processing on imaging data for a plurality of identical images given by the three-chip image sensor in the case of the first embodiment, and is configured to be able to execute second signal processing such as light vector calculation, parallax calculation, and 3D distance calculation based on information such as the per-area light intensity distribution and the per-area light travel direction of light incident on a one-chip image sensor via the microlens array in the case of the second embodiment of the present disclosure. However, signal processing in the camera ISP 18 may not only be realized in hardware, but also in software, for example.

The CPU 12 controls the camera module 1 while also controlling the respective units of the signal processing system 2 and conducting various computational processing.

The memory controller 13, under control by the CPU 12, controls the reading and writing of data to respective memory when, for example, temporarily storing various data such as imaging image to internal memory provided as one of the peripheral components 15, saving image data to high-capacity memory for data storage provided as one of the peripheral components 15, and retrieving image data from the high-capacity memory for data storage.

The GPU 14 is responsible for image drawing processes, etc. when displaying images, etc. on a display screen provided as one of the peripheral components 15. Herein, the GPU 14 conducts such image drawing processes, etc. under control by the CPU 12.

The encode/decode unit 19, under control by the CPU 12, executes processes such as encoding/compressing and decompressing/decoding image data, for example.

The audio processor 20, under control by the CPU 12, processes an audio signal picked up by a microphone provided as one of the peripheral components 15 and likewise executes audio signal processing when outputting audio from speakers provided as one of the peripheral components 15, for example.

The display controller 21, under control by the CPU 12, controls the operation of a display panel provided as one of the peripheral components 15 and the display of images on its screen, for example. The video output unit 22 outputs a video signal to the display panel under control by the CPU 12. The video output unit 22 also conducts video signal output to an external output port, for example.

[Schematic Configuration of Camera Module Provided with Three-Chip Image Sensor]

Figure 2:
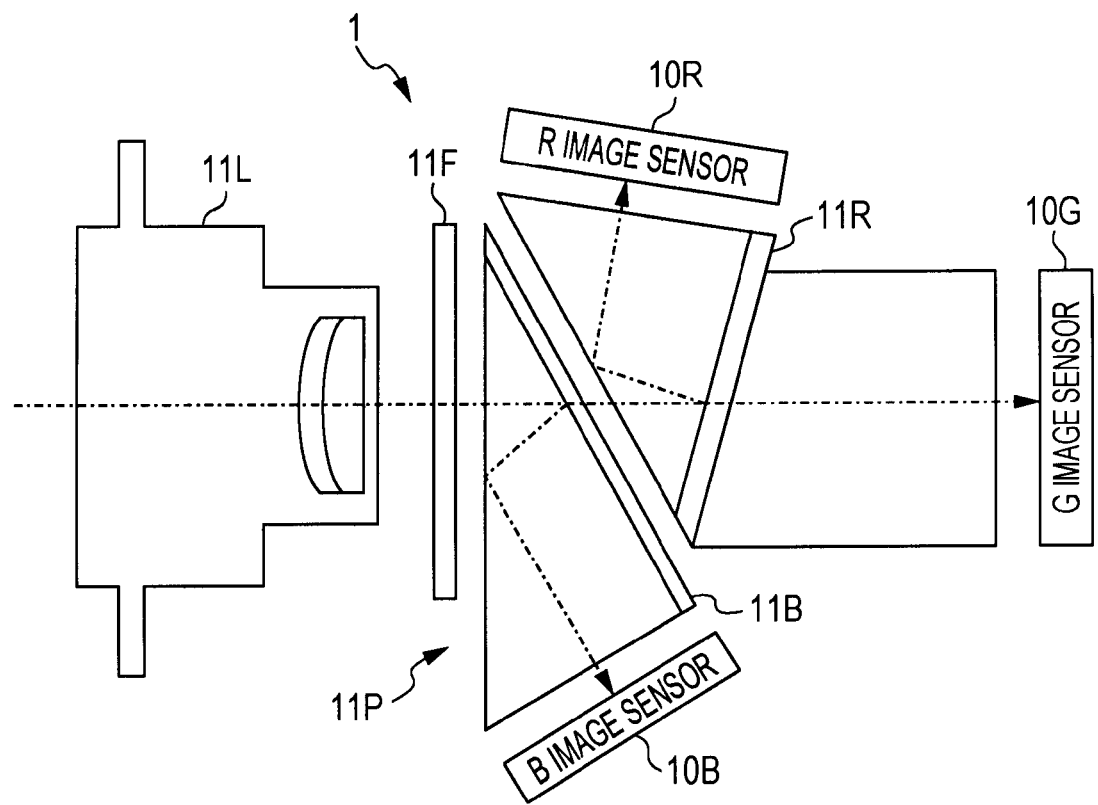
FIG. 2 is a schematic configuration diagram of a camera module 1 provided with a three-chip image sensor in a first embodiment of the present disclosure.

FIG. 2 illustrates an exemplary schematic configuration of a camera module 1 provided with the three-chip image sensor in the first embodiment of the present disclosure.

Figure 3:
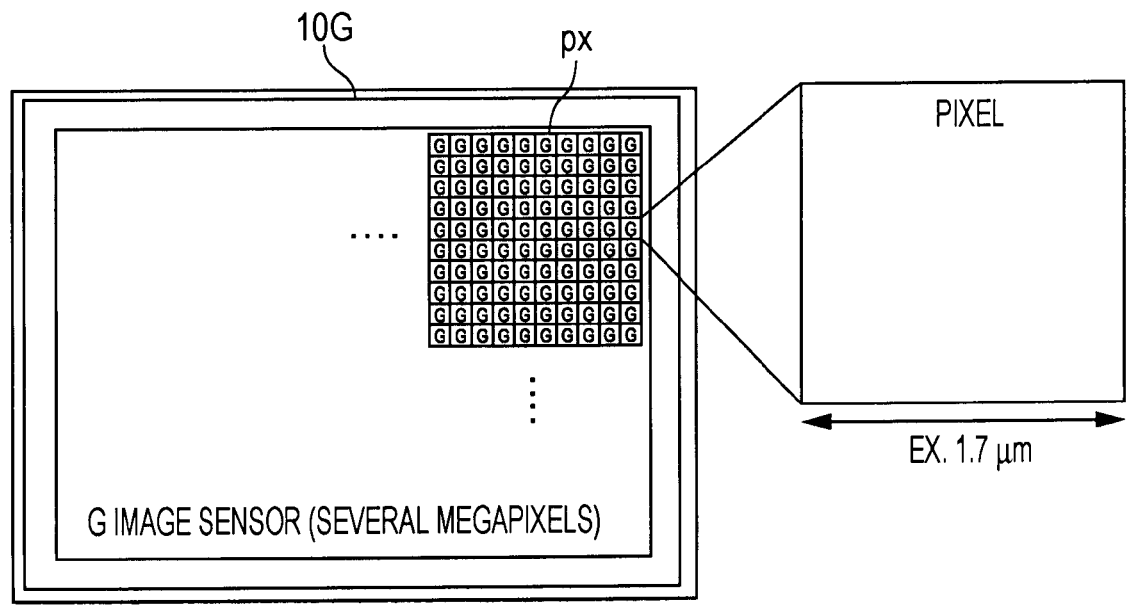
FIG. 3 is a diagram illustrating a schematic configuration of an image sensor for G light.

The camera module 1 illustrated in FIG. 2 is configured to include a lens system 11L, an optical low-pass filter 11F, for example, a dispersive prism 11P, and image sensors 10R, 10G, and 10B for the respective color components R, G, and B. Meanwhile, FIG. 3 illustrates a schematic configuration of the image sensor 10G for G light as a representative of the image sensors 10R, 10G, and 10B. The image sensor 10G is configured with several million pixels (px) of given size (several megapixels) arrayed thereon, for example. Although omitted from illustration, the image sensor 10R and the image sensor 10B are similarly configured.

The lens system 11L of the camera module 1 condenses incident light from a subject and forms an image of the subject on the image sensors 10R, 10G, and 10B. Furthermore, the lens system 11L may be additionally provided with a mechanical shutter, diaphragm mechanism, etc.

In the configuration illustrated in FIG. 2, light from the subject passes through the lens system 11L, and furthermore is incident on the dispersive prism 11P via the optical low-pass filter 11F.

The dispersive prism 11P is configured to include: a prism for B light having a dichroic mirror 11B for B light, which reflects the B light component from the incident light, formed on one surface thereof; a prism for R light having a dichroic mirror 11R for R light, which reflects the R light component from the incident light, formed on one surface thereof; and a prism for G light, which transmits the remaining G light component after the R light component and the B light component have been removed therefrom.

Thus, the B light component which has been dispersed from the incident light by the prism for B light is incident on the image sensor 10B for B light, the R light component which has been dispersed from the incident light by the prism for R light is incident on the image sensor 10R for R light, and the G light component which has passed through the prism for B light and the prism for R light is incident on the image sensor 10G for G light.

Consequently, imaging data for an image consisting only of the R light component contained in the incident light from the subject is output from the image sensor 10R for R light, imaging data for an image consisting only of the B light component contained in the incident light from the subject is output from the image sensor 10B for B light, and imaging data for an image consisting only of the G light component contained in the incident light from the subject is output from the image sensor 10G for G light. In other words, the images respectively formed on the three image sensors 10R, 10G, and 10B are images which are approximately identical to each other, except the color components differ by being R, G, or B.

[Relationships Among Imaging Data from Three-Chip Image Sensor, Array Converter, and Camera ISP]

Hereinafter, the relationship between output imaging data from the three-chip image sensor and imaging data input into the camera ISP 18 in an imaging apparatus of the first embodiment will be described with reference to FIGS. 4 to 8.

First, an imaging apparatus of the first embodiment includes a viewfinder mode and a capture mode as operational modes during camera imaging, and is able to appropriately switch between these modes.

The viewfinder mode is a mode for determining composition, etc. during imaging, for example, and is a mode in which various image data analysis processing discussed earlier such as AE, AWB, AF, face detection and smile detection, scene recognition, noise reduction, and shake detection are conducted while displaying a preview image on a display screen without saving image data to the high-capacity memory for data storage, for example. Also, since the viewfinder mode is a mode for the user to determine composition, etc. while viewing an image display on a display screen, the display on the display screen is a motion image display. For this reason, in the viewfinder mode, real-time processing is demanded. However, the motion image may be a comparatively low resolution such as 480×854 pixels, for example. Meanwhile, a function that, for example, temporarily stores images before and after pressing a shutter button and appropriately selects from the temporarily stored image data and saves when the shutter button is actually pressed later may be used. In such cases, image data may be temporarily accumulated in temporary memory, etc. even in the viewfinder mode, but description thereof is herein reduced or omitted.

On the other hand, the capture mode is a mode for executing imaging according to the ON operation of a shutter button, for example, and generating capture data for a still image that ultimately can be saved to the high-capacity memory for data storage, for example. Also, since the capture mode is a mode for saving still images to the high-capacity memory for data storage, etc., real-time processing like that of the viewfinder mode is not demanded. However, it is desirable for capture images of still images which are saved to the high-capacity memory for data storage to be high-resolution image data.

Figure 4:
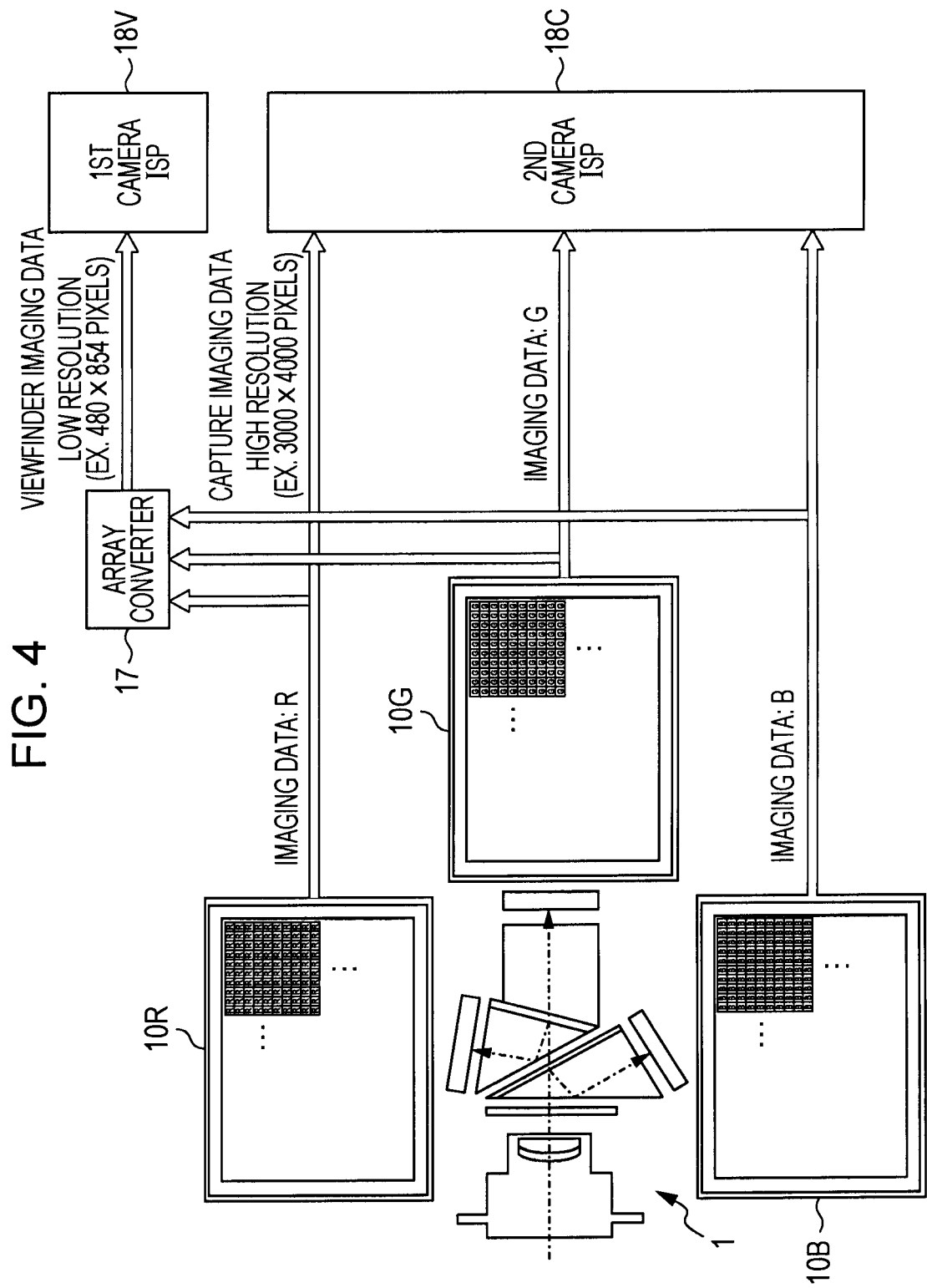
FIG. 4 is a diagram illustrating configurations of a three-chip image sensor as well as of an array converter, a first camera ISP, and a second camera ISP which process the imaging data therefrom in an imaging apparatus of a first embodiment of the present disclosure.

Additionally, as illustrated in FIG. 4, an imaging apparatus of the first embodiment of the present disclosure is provided with the array converter 17 and a first camera ISP 18V as a configuration for conducting signal processing in the viewfinder mode (first signal processing), while also being provided with a second camera ISP 18C as a configuration for conducting signal processing in the capture mode (second signal processing).

In other words, an imaging apparatus of the present embodiment is configured to controllably switch between conducting first signal processing with the first camera ISP 18V and conducting second signal processing with the second camera ISP 18C on imaging data output from the image sensors 10R, 10G, and 10B of the camera module 1, depending on whether the operational mode during camera imaging is set to the viewfinder mode or the capture mode. To explain in further detail, during the viewfinder mode, for example, an imaging apparatus of the present embodiment converts imaging data output from the image sensors 10R, 10G, and 10B of the camera module 1 into imaging data in the order of a given arrangement with the array converter 17, sends the array-converted imaging data to the first camera ISP 18V, and executes the first signal processing in the viewfinder mode. In contrast, in the case of having switched to the capture mode, an imaging apparatus of the present embodiment sends imaging data output from the image sensors 10R, 10G, and 10B of the camera module 1 to the second camera ISP 18C and executes the second signal processing in the capture mode.

Figure 5:
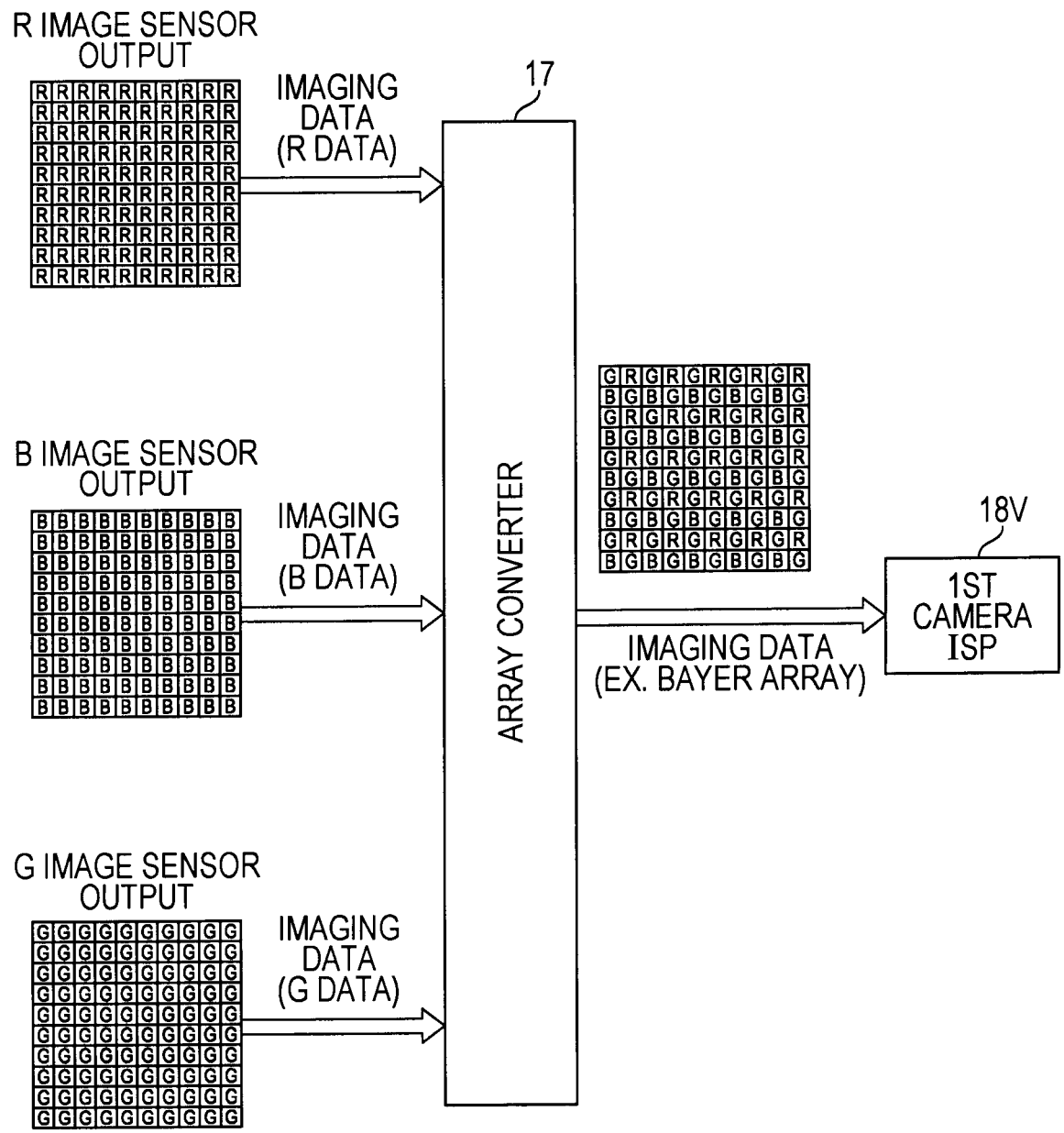
FIG. 5 is a diagram used to summarize an array conversion process conducted by an array converter.

Next, FIG. 5 illustrates an overview of an array conversion process in the array converter 17. Also, FIG. 6 illustrates an exemplary specific configuration of an array converter 17, FIG. 7 illustrates a timing chart for the array converter 17 in FIG. 6, and FIG. 8 illustrates details of an imaging data array conversion process according to the configuration in FIG. 7 and the timing chart in FIG. 6.

In an imaging apparatus of the present embodiment, the array converter 17 is configured to selectively retrieve imaging data in a given order according to the Bayer arrangement, for example, from imaging data respectively output from the image sensor 10R for R light, the image sensor 10G for G light, and the image sensor 10B for B light of the camera module 1, and output it to the first camera ISP 18V, as illustrated in FIG. 5.

Figure 6:
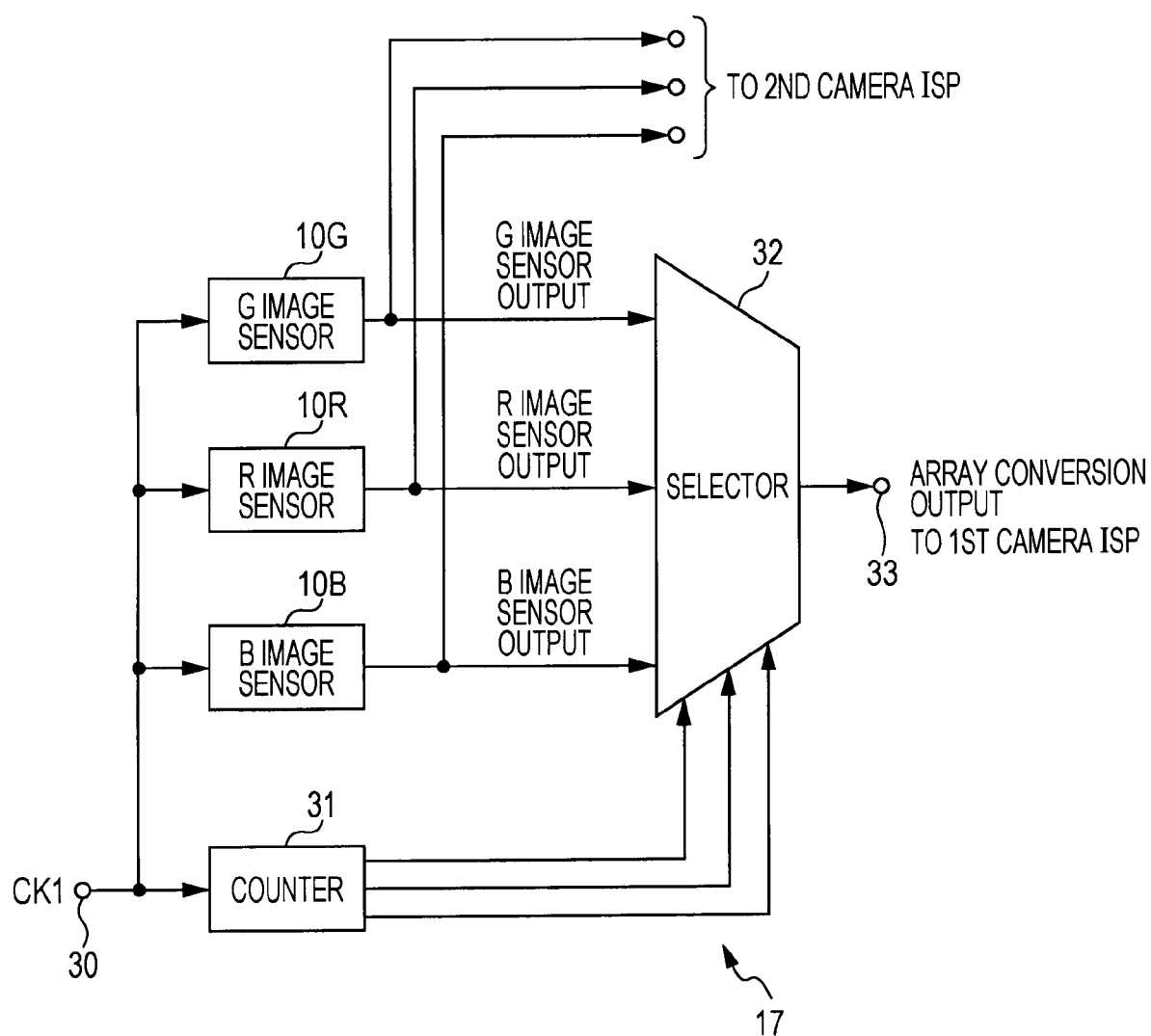
FIG. 6 is a block circuit diagram illustrating an exemplary specific circuit configuration of an array converter.

Namely, as an example, the array converter 17 may be configured to be provided with a counter 31 and a selector 32 as illustrated in FIG. 6. However, in FIG. 6, the image sensor 10R for R light, the image sensor 10G for G light, and the image sensor 10B for B light of the camera module 1, etc. are also drawn for the sake of convenience in explanation.

Figure 7:
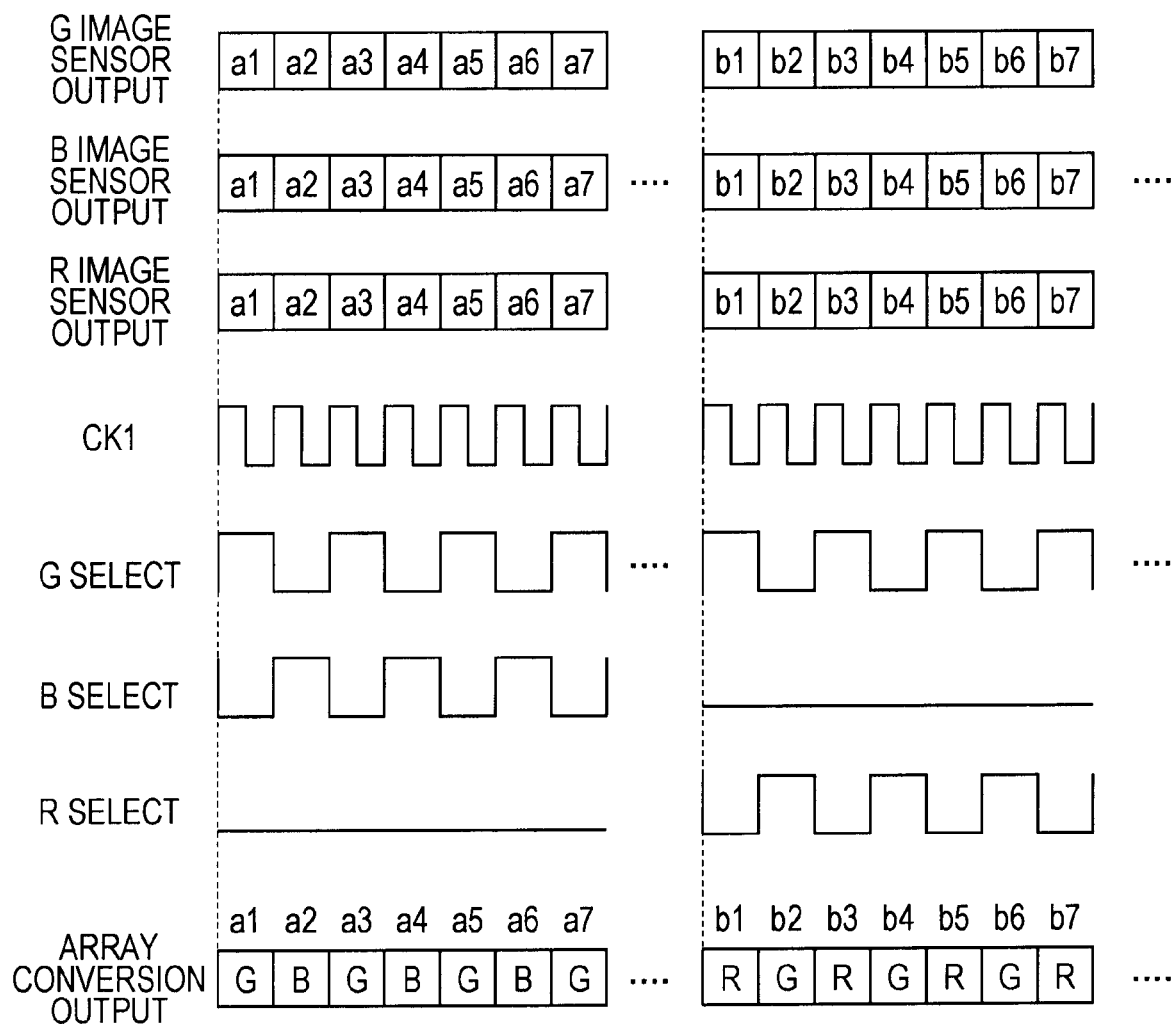
FIG. 7 is a timing chart for the array converter in FIG. 6.
Figure 8:
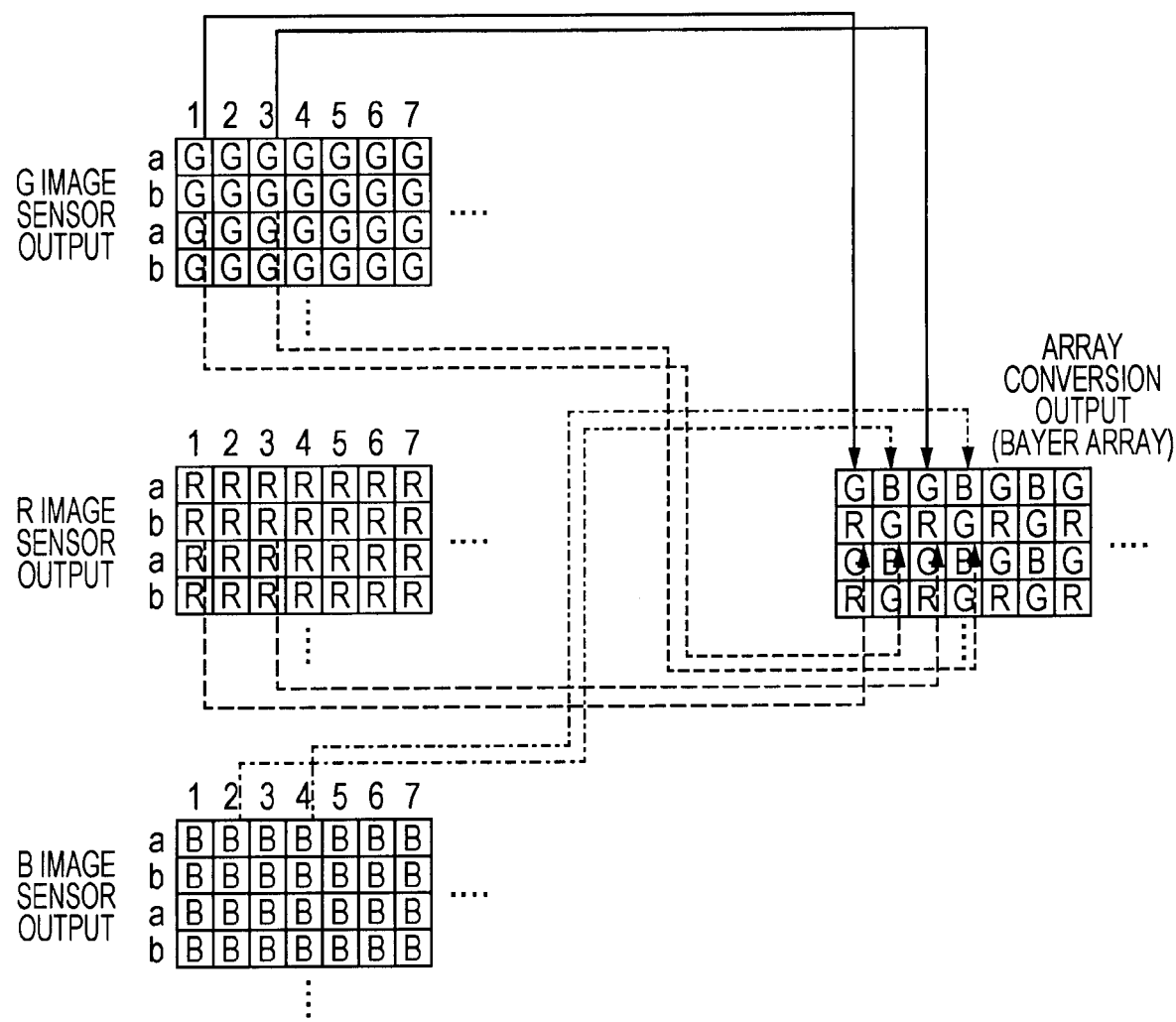
FIG. 8 is a diagram used to explain in detail an imaging data array conversion process according to the circuit configuration in FIG. 7 and the timing chart in FIG. 6.

In FIG. 6, a clock CK1 illustrated in FIG. 7 is input into a clock input terminal 30, and the clock CK1 is sent to the counter 31 and the image sensors 10R, 10G, and 10B. This clock CK1 is made to be a clock signal for determining output timings when the image sensors 10R, 10G, and 10B output per-pixel imaging data.

Once the clock CK1 is supplied to the image sensors 10R, 10G, and 10B, per-pixel imaging data is output with the rising timings, for example. In other words, in the case where the pixel arrays in the image sensors 10R, 10G, and 10B are expressed as "lines and columns" from "a1, a2, a3, a4, a5, a6, a7" to "b1, b2, b3, b4, b5, b6, b7" and so on as illustrated in FIG. 8, the image sensors 10R, 10G, and 10B respectively output imaging data in the "line and column" order of "a1, a2, a3, a4, a5, a6, a7" to "b1, b2, b3, b4, b5, b6, b7" and so on with the rising timings of the clock CK1.

The counter 31 counts the clock CK1 expressing the timings when the image sensors 10R, 10G, and 10B output imaging data, and generates a select signal for selecting imaging data in the order of a given arrangement such as the Bayer arrangement from the imaging data for a plurality of identical images output by the image sensors 10R, 10G, and 10B. In other words, in the case of the present embodiment, when imaging data from an "a row" is output from the image sensors 10R, 10G, and 10B, the counter 31 outputs a G select signal and a B select signal which alternately select imaging data from the image sensor 10G for G light and the imaging data from the image sensor 10B for B light every clock with the rising timings of the clock CK1, while also outputting an R select signal that does not select imaging data from the image sensor 10R for R light. Also, when imaging data from a "b row" is output from the image sensors 10R, 10G, and 10B, the counter 31 outputs a G select signal and an R select signal which alternately select imaging data from the image sensor 10G for G light and the imaging data from the image sensor 10R for R light every clock with the rising timings of the clock CK1, while also outputting a B select signal that does not select imaging data from the image sensor 10B for B light. The R select signal, G select signal, and B select signal output from the counter 31 are sent to the selector 32.

The selector 32 selects imaging data in the order of a given arrangement such as the Bayer arrangement from the imaging data for a plurality of identical images output by the image sensors 10R, 10G, and 10B, according to the select signals generated by the counter 31. In other words, in the case of the present embodiment, the selector 32 accepts imaging data output from the image sensors 10R, 10G, and 10B as input, and selects and outputs that imaging data according to, for example, the high levels of the R select signal, G select signal, and B select signal from the counter 31.

Thus, output data from the array converter 17 is data in which imaging data from the image sensor 10G for G light and imaging data from the image sensor 10B for B light has been alternately selected every clock with the rising timings of the clock CK1 when imaging data for an "a row" is output from the image sensors 10R, 10G, and 10B, and on the other hand is data in which imaging data from the image sensor 10G for G light and imaging data from the image sensor 10R for R light has been alternately selected every clock with the rising timings of the clock CK1 when imaging data for a "b row" is output from the image sensors 10R, 10G, and 10B. In other words, in the case of this example, the order of imaging data output from the selector 32 is an order corresponding to the Bayer arrangement, for example. Imaging data output from the selector 32 is sent to the first camera ISP 18V from an imaging data output terminal 33.

[Exemplary Processing Sequence Conducted Among Image Sensor and Array Converter of Camera Module and Camera ISP in the First Embodiment]

Figure 9:
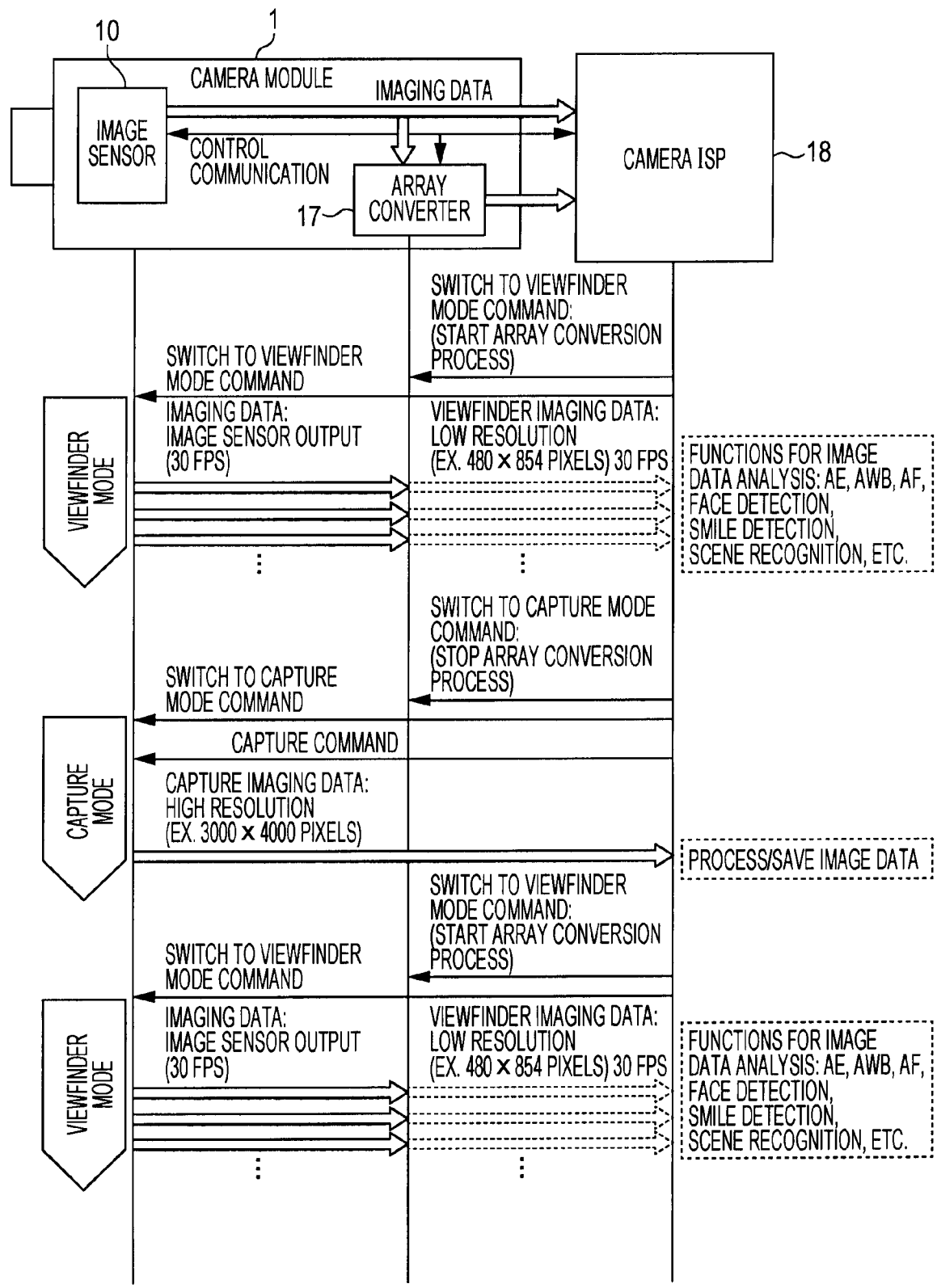
FIG. 9 is a sequence diagram of a sequence conducted among a camera module, a camera ISP, and an array converter of an imaging apparatus of a first embodiment.

FIG. 9 illustrates a processing sequence diagram for a processing sequence conducted among the image sensor 10 and the array converter 17 of the camera module 1 and the camera ISP 18 of an imaging apparatus of the first embodiment.

In FIG. 9, when switching to the viewfinder mode, the camera ISP 18 sends a "switch to viewfinder mode" command indicating as much to the camera module 1.

Having received the "switch to viewfinder mode" command, the camera module 1 starts the above-discussed array conversion process in the array converter 17, which generates imaging data in the order of a given arrangement.

Also, having received the "switch to viewfinder mode" command, the camera module 1 outputs the imaging data from the image sensor 10 at 30 fps, for example. Imaging data output from the image sensor 10 is converted to the order of a given arrangement by the array converter 17, and then sent to the camera ISP 18.

At this point, the camera ISP 18 uses imaging data supplied from the camera module 1 to conduct a process for generating a preview image to be displayed on a viewfinder screen and various image data analysis processing such as AE, AWB, AF, face detection and smile detection, scene recognition, noise reduction, and shake detection, as discussed earlier.

Also, when switching from the viewfinder mode to the capture mode, the camera ISP 18 sends a "switch to capture mode" command indicating as much to the camera module 1.

Having received the "switch to capture mode" command, the camera module 1 suspends the above-discussed array conversion process in the array converter 17.

Also, having received the "switch to capture mode" command, the camera module 1 outputs high-resolution imaging data from the image sensor 10. Then, high-resolution imaging data output from the image sensor 10 is sent to the camera ISP 18. At this point, the camera ISP 18 uses the high-resolution imaging data to generate a capture image as discussed earlier.

Subsequently, when switching from the capture mode to the viewfinder mode, the camera ISP 18 sends a "switch to viewfinder mode" command to the camera module 1 similarly to the above. Thus, a process similar to the above is conducted thereafter.

Herein, the array conversion process in the array converter 17 and the respective signal processing in the first camera ISP 18V and second camera ISP 18C discussed above may also be realized in software. In other words, an imaging signal processing program of an embodiment of the present disclosure is made to be a program enabling a CPU, etc. to execute such an array conversion process and respective signal processing.

[Comparison of the Cases of a One-Chip Image Sensor in a Bayer Arrangement, a Three-Chip Image Sensor, and a Three-Chip Image Sensor Plus Array Conversion in the First Embodiment of the Present Disclosure]

Figures 10, 11:
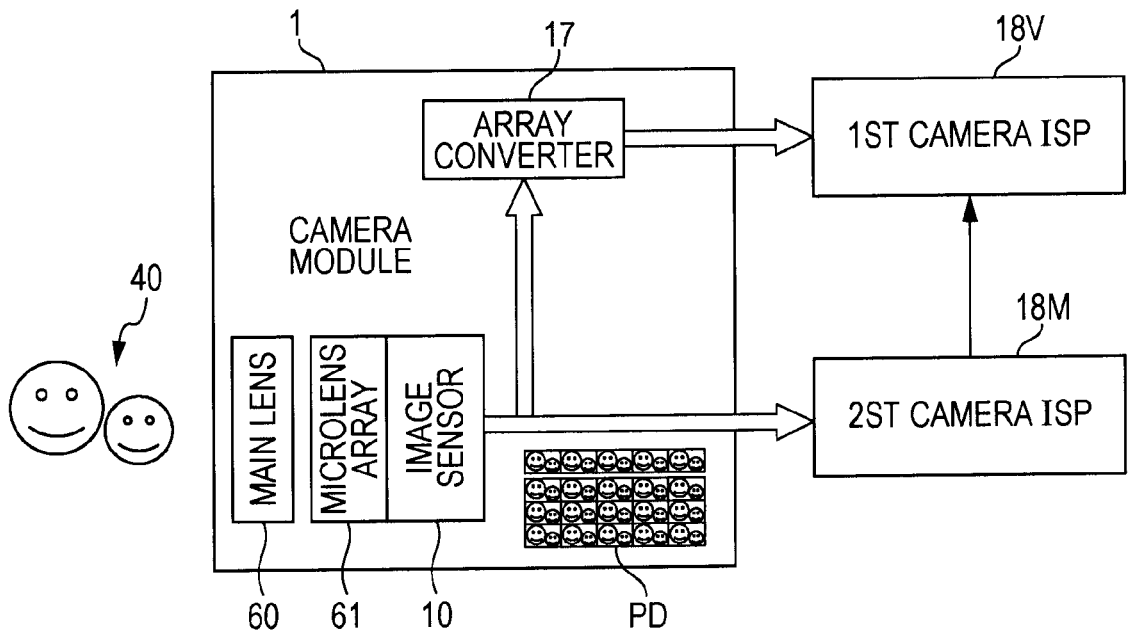
FIG. 10 is a diagram illustrating a comparison of image quality, general system affinity, and viewfinder mode function reusability among the case of using imaging data from a three-chip image sensor and imaging data which has been array-converted therefrom, the case of outputting only imaging data in a Bayer arrangement from a one-chip image sensor, and the case of outputting only imaging data from a three-chip image sensor.
FIG. 11 is a diagram illustrating a schematic block configuration of an imaging apparatus of a second embodiment of the present disclosure.

FIG. 10 illustrates a comparison of image quality, general system affinity, and viewfinder mode function reusability obtained by respective systems, being a system that uses imaging data from an R, G, and B three-chip image sensor and imaging data which has been array-converted therefrom as in the above-discussed first embodiment of the present disclosure, a system that outputs only imaging data in a Bayer arrangement from a one-chip image sensor, and a system that outputs only imaging data from an R, G, and B three-chip image sensor.

In FIG. 10, in the case where imaging data from the R, G, and B three-chip image sensor is array-converted and first signal processing is conducted by the first camera ISP 18V during viewfinder mode, while second signal processing is conducted by the second camera ISP 18C to generate a capture image from imaging data from the three-chip image sensor during capture mode, as in the above-discussed first embodiment of the present disclosure, the viewfinder mode functions given by a general signal processing system can be reused during the viewfinder mode, and in addition, a capture image with high image quality can be obtained during capture mode. In this way, an exemplary embodiment of the present disclosure has a high affinity with general signal processing systems.

In contrast, a high-resolution image cannot be obtained as a capture image in the case of a system that outputs only imaging data in a Bayer arrangement from a one-chip image sensor, for example, and conducts signal processing thereon. Also, although the quality of capture images is favorable in the case of a system that outputs only imaging data from an R, G, and B three-chip image sensor, for example, it is difficult to reuse the viewfinder mode functions, etc. given by a general signal processing system.

[Configuration and Signal Processing of Second Embodiment which Forms Identical Images in Respective Areas on a One-Chip Image Sensor with a Microlens Array]

Next, FIG. 11 illustrates an exemplary schematic configuration of an imaging apparatus of a second embodiment of the present disclosure, which is able to form identical images in respective areas on a one-chip image sensor with a microlens array.

An imaging apparatus of the second embodiment of the present disclosure is configured to include a camera module 1, a first camera ISP 18V, and a second camera ISP 18M.

The camera module 1 is configured to include a main lens 60, a microlens array 61, a one-chip image sensor 10, and an array converter 17.

The main lens 60 causes incident light from a subject to be focused on the microlens array 61. That is, in other words, the microlens array 61 is disposed at the focal plane (the image-forming plane) of the main lens 60. Furthermore, an aperture diaphragm, etc. may also be disposed on the side of the main lens 60 where light enters or where light emerges.

Figure 12:
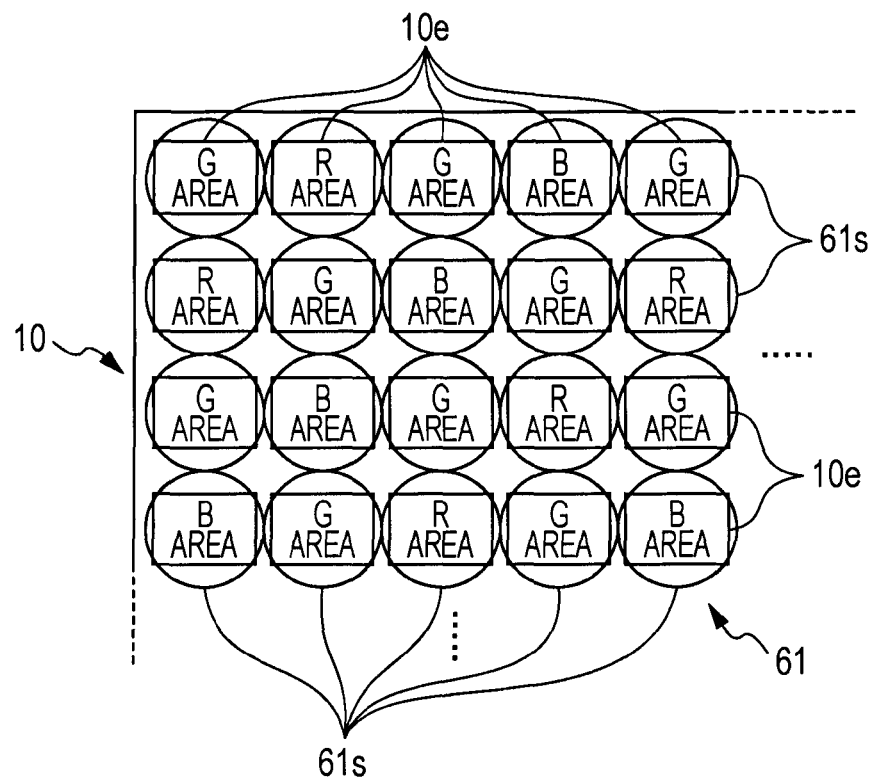
FIG. 12 is a diagram used to explain a microlens array and an arrangement of areas on an image sensor.

In the microlens array 61, a plurality of microlenses 61s like those illustrated in FIG. 12 are formed in an array on the image-forming plane of the main lens 60 as discussed above. Additionally, the focal points of the individual microlenses constituting the microlens array 61 are aligned with the sensor plane of the one-chip image sensor 10. That is, in other words, the sensor plane of the one-chip image sensor 10 is disposed so as to be aligned with the focal points of the individual microlenses of the microlens array 61. Furthermore, the microlens array 61 is configured such that the plurality of microlenses 61s are formed on a substrate such as glass, for example, with the individual microlenses 61s composed of solid lenses, liquid crystal lenses, or diffraction lenses, for example. Additionally, as discussed later, the two-dimensional array of microlenses 61s in the microlens array 61 corresponds to an array of areas 10e on the one-chip image sensor 10.

Figure 13:
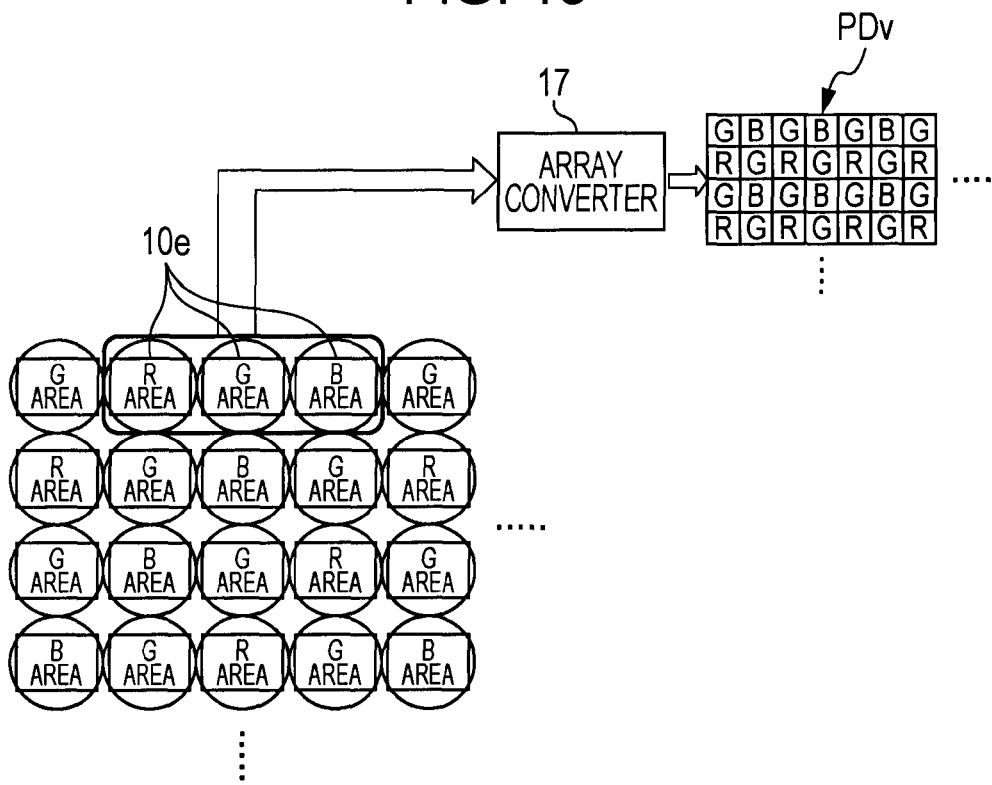
FIG. 13 is a diagram used to explain a process that conducts array conversion of imaging data from adjacent R, G, and B areas on an image sensor.

As illustrated in FIGS. 12 and 13, the sensor plane of the one-chip image sensor 10 is divided into a plurality of areas 10e of given size consisting of groups of several pixels each. Furthermore, a color filter is also placed over the areas 10e of the one-chip image sensor 10, in which an R, G or B filter is respectively placed over each area. Additionally, as discussed above, the individual microlenses 61s of the microlens array 61 are disposed in correspondence with the two-dimensional array of areas 10e on the one-chip image sensor 10.

Figure 15:
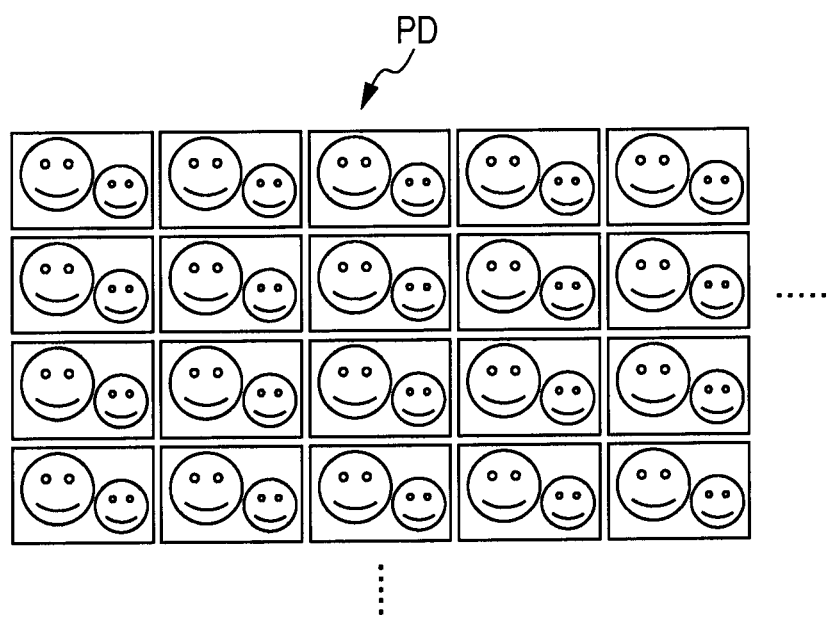
FIG. 15 is a diagram illustrating an exemplary plurality of identical images formed by a microlens array and individual areas on an image sensor in a second embodiment.

In other words, in the camera module 1, incident light from a subject 40 passes through the main lens 60 and is led to the microlens array 61, and in addition, respectively identical images are formed in the respective areas 10e of the one-chip image sensor 10 by the individual microlenses 61s constituting the microlens array 61. Thus, an image output from the image sensor 10 becomes an image PD in which an identical image has been imaged in each area 10e of the one-chip image sensor 10, as illustrated in FIGS. 11 and 15. Then, in the present embodiment, imaging data for an image PD output from the image sensor 10 of the camera module 1 is sent to the second camera ISP 18M while also being to the array converter 17.

Although the sensor plane of the one-chip image sensor 10 is divided into plural areas in the present embodiment, the individual areas may also be composed of respectively separate image sensors.

In the second embodiment of the present disclosure provided with a camera module 1 like that discussed above, the first camera ISP 18V is configured to conduct signal processing similar to that of the first camera ISP 18V of the first embodiment discussed earlier. In other words, the first signal processing conducted by the first camera ISP 18V is made to be various data analysis processing similar to that discussed earlier, such as AE, AWB, AF, face detection and smile detection, scene recognition, noise reduction, and shake detection.

On the other hand, in the second embodiment, the second camera ISP 18M executes various signal processing besides a process that generates a capture image to be saved to memory, including light vector calculation, parallax calculation, and 3D distance calculation based on information such as the intensity distribution of light incident on the image sensor 10 and the travel direction of incident light, color gain correction using AWB data given by the first signal processing, a process that corrects the parallax, and a process that generates a preview image to be displayed on a viewfinder screen by combining several identical images.

In other words, light rays passing through the main lens 60 and the microlens array 61 and incident on the image sensor 10 can be expressed as light vectors which retain information on the travel direction of the light in addition to its intensity distribution. Consequently, imaging data output from the image sensor 10 will contain light vector information including such information on the intensity distribution and travel direction.

Additionally, the second camera ISP 18M generates a plurality of parallax images with respectively different viewpoints in the individual areas, on the basis of imaging data supplied from the image sensor 10. In other words, since the imaging data also contains information on the travel direction of light rays in addition to their intensity distribution in each of the areas, it also becomes possible to resolve and detect individual light rays. Consequently, the second camera ISP 18M respectively extracts imaging data in each area corresponding to pixels at the same position and forms images consisting of the extracted imaging data, and thus is able to generate a plurality of parallax images with respectively different viewpoints in the individual areas.

Moreover, the second camera ISP 18M is able to obtain information on the distance to a desired subject by using the data for the plurality of parallax images to conduct a correlation process based on the parallax images from at least two adjacent areas, for example. Consequently, generating an image focused on the desired subject by combining parallax images from individual areas on the basis of such distance information becomes realizable, for example.

Also, the second camera ISP 18M executes color gain correction using AWB data given by the first camera ISP 18V, a process to correct parallax possessed by the plurality of images, and a process to generate a preview image to be display on a viewfinder screen by combining several identical images.

Figure 14:
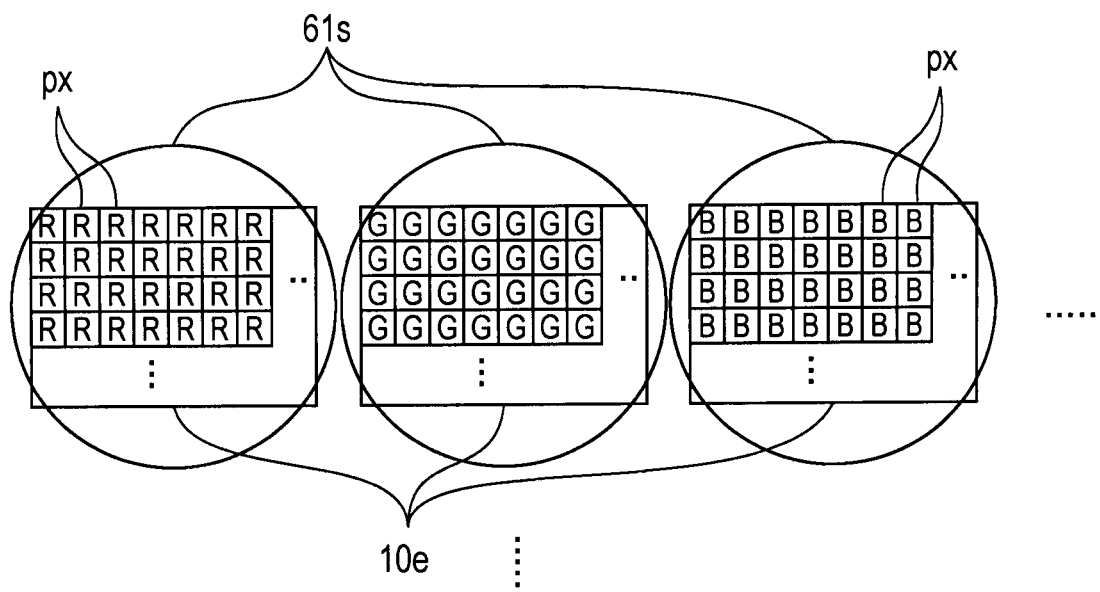
FIG. 14 is a diagram illustrating adjacent R, G, and B areas and individual pixels on an image sensor.

Note that in the second embodiment, the viewfinder image can be generated using imaging data from adjacent areas corresponding to R, G, and B, for example, from among the plurality of areas, as illustrated in FIGS. 13 and 14, for example. In other words, the second camera ISP 18M may, for example, use imaging data from the three adjacent areas corresponding to R, G, and B, and after conducting color gain correction using AWB data given by the first camera ISP 18V and a process to correct the parallax, combine those three sets of imaging data to generate a viewfinder image. Also, in the present embodiment, the first camera ISP 18V may use imaging data from the three adjacent areas corresponding to R, G, and B to generate imaging data in a given order such as the Bayer arrangement, for example, by conducting array conversion similar to the case of the first embodiment discussed earlier, and use the array-converted imaging data to generate a viewfinder image.

It is also possible for the second camera ISP 18M to generate images for 3D display, for example, by using the data for parallax images.

Otherwise, the array conversion processing of the array converter 17 and the respective signal processing in the first camera ISP 18V and the second camera ISP 18M discussed above may also be realized in software. In other words, an imaging signal processing program of an embodiment of the present disclosure is made to be a program enabling a CPU, etc. to execute such an array conversion process and respective signal processing.

[Schematic Block Configuration of High-Performance Mobile Information Device Provided with an Imaging Apparatus of the Embodiments]

An imaging apparatus of the first and second embodiments of the present disclosure discussed in the foregoing may be applied to the camera unit, etc. of a high-performance mobile information device, for example.

Figure 16:
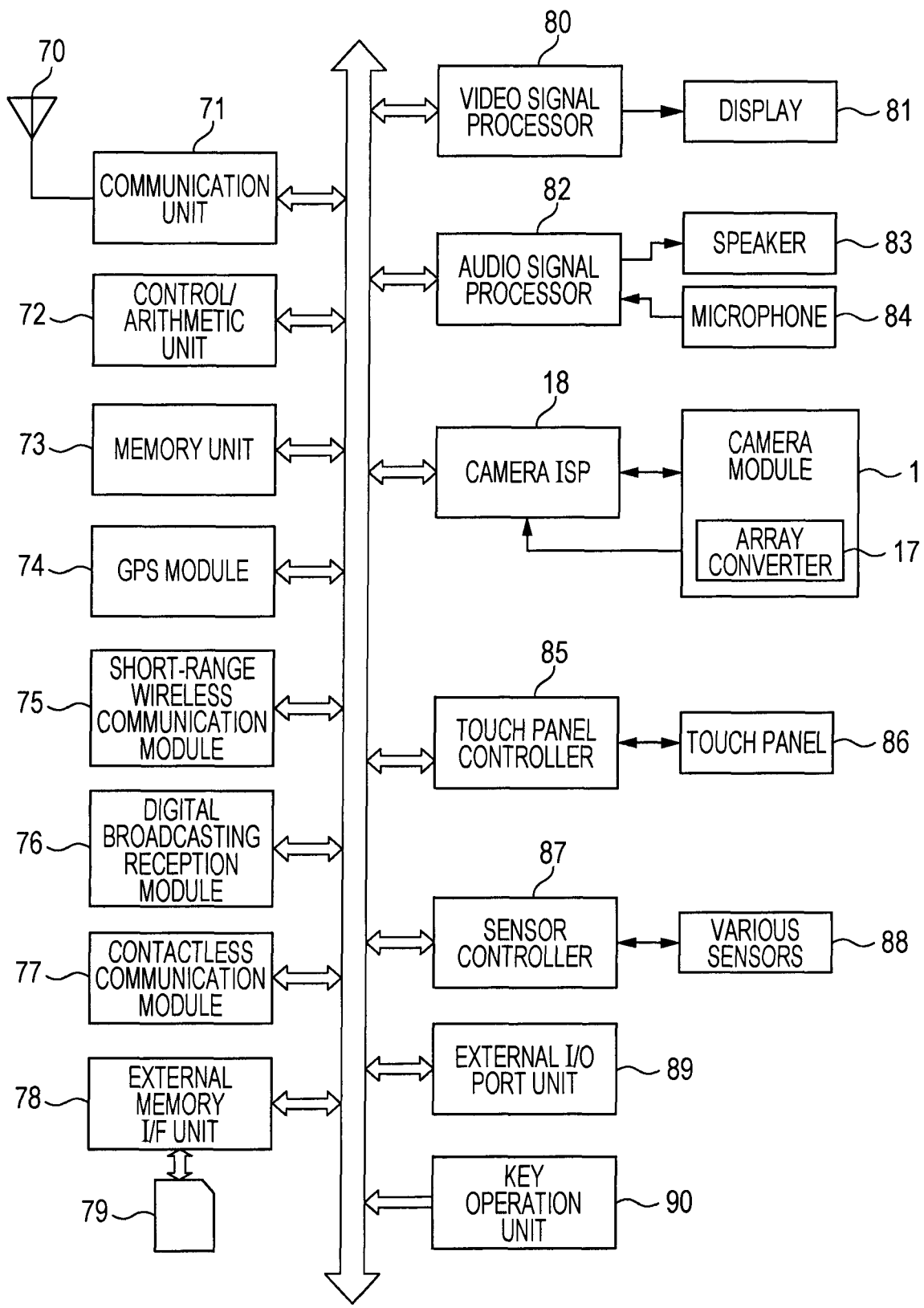
FIG. 16 is a block diagram illustrating a schematic internal configuration of a high-performance mobile information device equipped with an imaging apparatus of the present embodiment.

FIG. 16 illustrates an exemplary schematic internal block configuration of a high-performance mobile information device equipped with an imaging apparatus of an embodiment of the present disclosure.

In FIG. 16, the communication antenna 70 is an internally-housed antenna, for example, which transmits and receives telephony and electronic mail via a mobile phone network or a public wireless communication network, and transmits and receives signal waves for downloading various programs and connecting to the Internet, etc. The communication unit 71 includes an antenna circuit and a transceiver circuit unit, and conducts frequency conversion, modulation, and demodulation, etc. of signals transmitted and received via a mobile phone network or a public wireless communication network. Furthermore, although discussed in detail later, in the present embodiment, a program acquired via the communication antenna 70 and the communication unit 71 may be given as an example of an imaging signal processing program of the present embodiment.

The speaker 83 is a speaker provided on the mobile information device of the present embodiment, which outputs music playback, telephony receiver audio, and ringer sounds (ringtones), for example. The microphone 84 is used to pick up external audio and telephony transmitter audio. The audio signal processor 82 consists of an amplifier circuit for the speakers 83, an amplifier circuit for the microphone 84, a decompression/decoder circuit that decompresses/decodes compressed/encoded audio data supplied from a control/computation unit 72, a digital/analog converter circuit that converts such decompressed/decoded digital audio data into an analog audio signal, an analog/digital converter circuit that converts an analog audio signal input from the microphone 84 into digital audio data, and a compression/encoder circuit that compresses/encodes such digital audio data.

The key operation unit 90 consists of hardware keys provided on the chassis of the mobile information device of the present embodiment and their peripheral circuits. The key operation unit 90 converts hardware key operation input made by the user into an electrical signal, amplifies and analog/digitally converts the operation input signal, and sends the analog/digitally converted operation input data to the control/computation unit 72. Also, in the present embodiment, besides a shutter button used during imaging by the camera module 1, the key operation unit 90 may also be provided with various keys usable for a digital camera as necessary, such as keys for zoom operations, exposure settings, and shutter speed settings.

The external memory I/F unit 78 consists of an external memory slot into which external memory 79 consisting of a semiconductor storage medium is loaded or removed, and an interface circuit for external memory data communication. A mobile information device of the present embodiment is made to be able to acquire various types of data and various types of programs via a storage medium such as external memory 79 loaded into the external memory I/F unit 78. Furthermore, in the present embodiment, various types of programs acquired via the external memory 79 may be given as examples of an imaging signal processing program of the present embodiment. Also, an imaging signal processing program of the present embodiment may be recorded to, for example, a disk-based recording medium or some other recording medium. In this case, the program read out from the recording medium by a recording medium playback apparatus provided in a personal computer, for example, may be supplied to the external input/output port unit 89. Obviously, a recording medium playback apparatus may be directly connected to the external input/output port unit 89, with an imaging signal processing program being read out by the playback apparatus and supplied to a mobile information device of the present embodiment. Furthermore, the external memory 79 is also usable as the high-capacity memory for data storage discussed earlier.

The external input/output port unit 89 consists of, for example, a connector for a cable connection and an interface circuit for external data communication when conducting data communication via a cable, and a charge port and an interface circuit for charging when charging an internal battery via a power cable. A mobile information device of the present embodiment is made to be able to acquire various types of data and various programs from external devices connected to the external input/output port unit 89. In the present embodiment, various types of programs acquired via the external input/output port unit 89 may be given as examples of an imaging signal processing program of the present embodiment.

The short-range wireless communication module 75 consists of a communication antenna for short-range wireless radio waves such as those of a wireless LAN or Bluetooth (registered trademark), and a short-range wireless communication circuit. An imaging signal processing program in accordance with the present embodiment may also be acquired via the short-range wireless communication module 75.

The digital broadcasting reception module 76 consists of a receiving antenna and tuner for so-called digital television broadcasting and digital radio broadcasting. The digital broadcasting reception module 76 is made to be able to receive not only digital broadcasting on one channel, but to receive digital broadcasting on several channels simultaneously. Also, the digital broadcasting reception module 76 is made to be able to also receive data multiplexed into digital broadcasting. Furthermore, it is configured such that digital broadcasting data received by the digital broadcasting reception module 76 can also be stored in the memory unit 73 after being compressed by the control/computation unit 72, for example. Also, an imaging signal processing program in accordance with the present embodiment may be broadcast as one such set of digital broadcasting data. In this case, such programs are extracted from digital broadcasting data received by the digital broadcasting reception module 76 and incorporated into a mobile information device of the present embodiment.

The contactless communication module 77 conducts, via a contactless communication antenna, contactless communication in which what is called radio-frequency identification (RFID) or contactless smart cards are used, for example. An imaging signal processing program in accordance with the present embodiment may also be acquired via the contactless communication module 77.

The Global Positioning System (GPS) module 74 includes a GPS antenna, and uses GPS signals from GPS positioning satellites to compute the latitude and longitude at the device's present location. GPS data (information expressing latitude and longitude) obtained by the GPS module 74 is sent to the control/computation unit 72. Thus, the control/computation unit 72 is able to ascertain the present location and movement of the device itself.

The various sensors 88 consist of acceleration sensors, tilt sensors, orientation sensors, temperature sensors, humidity sensors, and illumination sensors, as an example.

The sensor controller 87 computes the acceleration, tile, orientation, temperature, humidity, and illumination, for example, according to output signals from the various sensors 88. Furthermore, the sensor controller 87 also includes various sensor drivers which control operation of the various sensors 88.

The camera module 1 corresponds to the camera module 1 of the first or second embodiment discussed earlier, and includes the above-discussed image sensor 10 for imaging still images and motion images, an optical system for forming subject images on the image sensor 10, a driving mechanism that operates the optical system and a diaphragm, etc., a shutter speed adjustment mechanism that mechanically or electronically adjusts the shutter speed, an image stabilization mechanism that corrects for what is called camera shake, a light for emitting flash, a driving circuit that drives these mechanisms, and the above-discussed array converter 17. Furthermore, the optical system of the camera module 1 may also be provided with an optical zoom mechanism.

The camera ISP 18 corresponds to the camera ISP 18 of the first or second embodiment discussed earlier, and conducts respective signal processing as discussed earlier.

Herein, the camera ISP 18 and the array converter 17 may be configured in hardware as discussed above, but obviously the may also be configured in software. In the case of configuring in software, the respective signal processing and array conversion process are realized by the control/computation unit 72 executing an imaging signal processing program of an embodiment of the present disclosure, for example. However, a mobile information device in this case will not include the camera ISP 18 and the array converter 17, and will instead be provided with a camera operation controller, etc. that conducts activation of the camera module 1 and imaging operations by the image sensor, for example. Otherwise, an imaging signal processing program in accordance with the present embodiment may be included in a camera application program.

Image data generated by the camera ISP 18 is sent to the video signal processor 80. Also, in the present embodiment, it is configured such that it is also possible for image data generated by the camera ISP 18 to be sent to and compressed by the control/computation unit 72, and then stored in the memory unit 73 or external memory 79 connected to the external memory I/F unit 78.

The video signal processor 80 includes the above-discussed GPU 14 and display controller 21, and conducts a decompression/decoding process that decompresses/decodes compressed/encoded video data supplied from the control/computation unit 72, a process that displays decompressed/decoded digital video or digital broadcasting video data received by the digital broadcasting reception module 76 on a display panel 81, and a process that causes playback images read out from the memory unit 73, etc. to be displayed on the display panel 81. Also, the video signal processor 80, under control by the control/computation unit 72, generates a video signal for displaying a desktop image, various menu images, a text input screen, photographic images or synthesized images, virtual key and virtual button images, etc., and causes these images to be displayed on the display panel 81. Herein, the display panel 81 consists of a liquid crystal panel or an organic EL panel, for example. Also, in the present embodiment, the video signal processor 80 conducts a process to display a preview image supplied from the camera ISP 18 on the display panel 81.

The touch panel 86 is disposed over the panel of the display panel 81 and has a size that covers approximately the entire surface of the display panel. The touch panel 86 is a device having a structure in which a plurality of transparent electrode patterns are arrayed in the XY directions on a panel surface consisting of transparent sensor glass. By detecting changes in capacitance according to the transparent electrode patterns, it is possible to sense that a user's finger or other external conductor has touched or come into proximity with the panel surface, and output information on XY coordinate positions on the panel surface when the external conductor touches or comes into proximity therewith.

The touch panel controller 85 controls operation and scanning of the touch panel 86, while also determining if an external conductor has touched or come into proximity with the touch panel 86, calculating the touch position of the proximity position, calculating approximately how close an external conductor has come into proximity with the panel surface during a proximity operation, and calculating information such as the amount of time sustained during a state of touch or proximity, the time interval between detecting touch or proximity, the direction and speed at which an external conductor moved in a state of touch or proximity, and a movement trace, etc., on the basis of capacitance values detected by the touch panel 86 and XY coordination position information detected by the touch panel 86. The touch panel controller 85 then delivers the data obtained by such detection, calculation, computation, etc. to the control/computation unit 72. Furthermore, the touch panel controller 85 also includes a touch panel driver that controls operation and scanning of the touch panel 86.

The memory unit 73 consists of built-in memory internally provided in the device and removable card-type memory, etc. A card storing what is called subscriber identity module (SIM) information, etc. may be given as an example of the removable card-type memory. The built-in memory consists of read-only memory (ROM) and random access memory (RAM). The ROM is able to store an operating system (OS), control programs for the control/computation unit 72 to control respective units, various default settings, dictionary data, text prediction/conversion dictionary data, and various audio data, as well as various programs including a text editor, HTML editor, mailer, and image editor together with an imaging signal processing program of the present embodiment. The ROM includes rewritable ROM such as NAND-type flash memory or EEPROM (Electrically Erasable Programmable Read-Only Memory), and is made to be able to save email data, telephone contacts and address book data, still image and motion image data, as well as various user settings. The RAM stores data as needed, acting as a work area and buffer area when the control/computation unit 72 conducts various data processing.

The control/computation unit 72 consists of a central processing unit (CPU), controls units such as the communication unit 71, the video signal processor 80, the camera ISP 18, the camera module 1 and array converter 17, the audio signal processor 82, the sensor controller 87, the GPS module 74, the short-range wireless communication module 75, the digital broadcasting reception module 76, the contactless communication module 77, the external memory I/F unit 78, and the external input/output port unit 89, and conducts various computations as necessary. Also, the control/computation unit 72 executes a control program stored in the memory unit 73, a text editor, an HTML editor, a mailer, an image editor, and various other programs.

Meanwhile, in a mobile information device of the present embodiment, in the case where the previously discussed signal processing of the camera ISP 18 or the array conversion process of the array converter 17 is executed according to an imaging signal processing program, the control/computation unit 72 executes the imaging signal processing program. A process flow for this case is described later.

Otherwise, a mobile information device of the present embodiment may obviously also include components provided in a typical mobile information device, such as a clock unit that keeps and measures time, and a battery that supplies power to respective units as well as a power management IC that controls such power.

[Process Flow in Control/Computation Unit while Executing Imaging Signal Processing Program]

Figure 17:
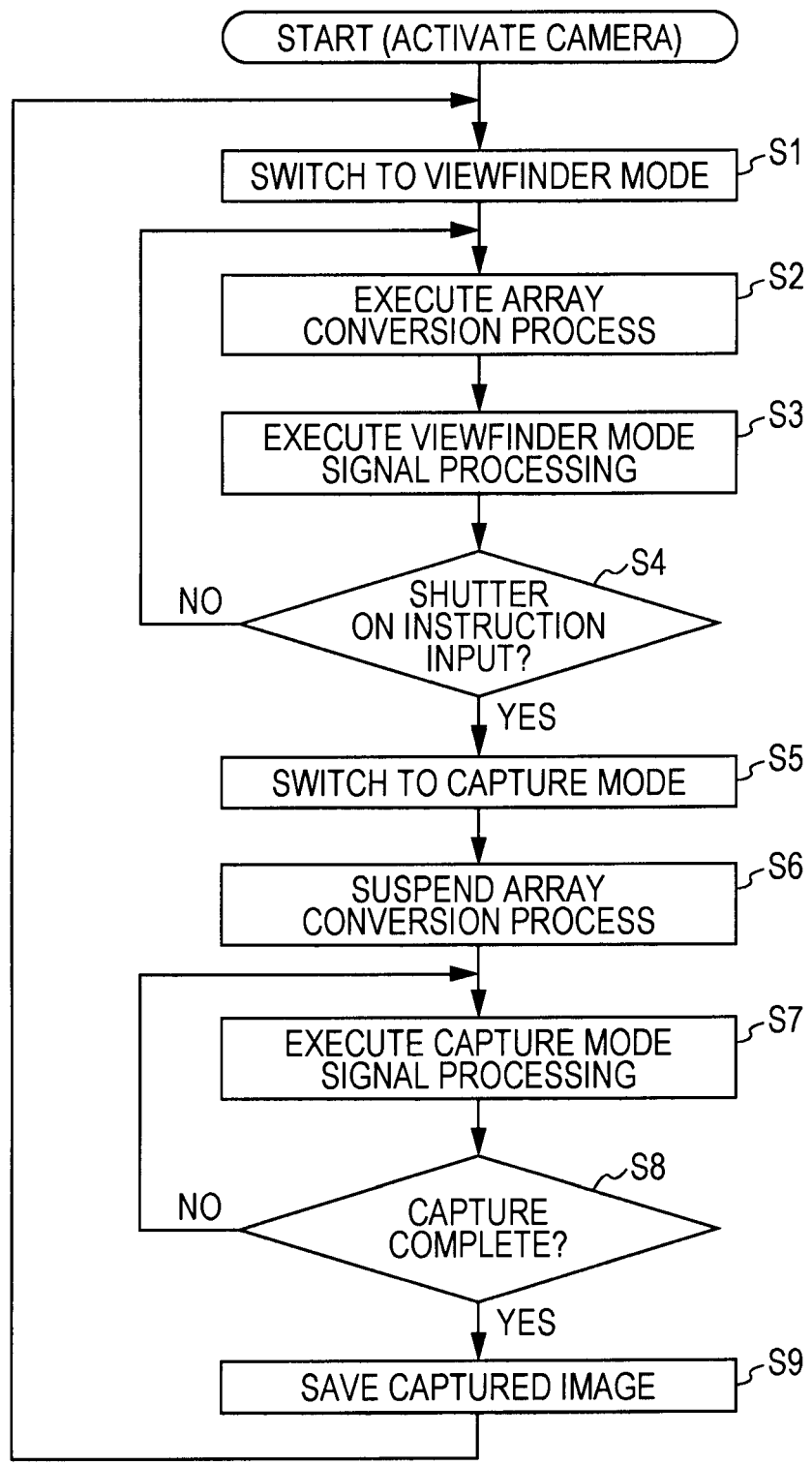
FIG. 17 is a flowchart illustrating a process flow in the case of conducting processing in a viewfinder mode and a capture mode of a first embodiment due to the control/computation unit of a mobile information device of the present embodiment executing an imaging signal processing program of the present disclosure.

FIG. 17 illustrates a process flow in a mobile information device of an embodiment of the present disclosure for the case of conducting the previously discussed viewfinder mode and capture mode processing due to the control/computation unit 72 executing an imaging signal processing program of the present disclosure, herein taking the previously discussed first embodiment by way of example.

In the flowchart in FIG. 17, when camera activation instructions for imaging are input by the camera user via an operation on the key operation unit 90 or the touch panel 86, for example, the control/computation unit 72 starts the process of the flowchart and first switches to a viewfinder mode that displays a preview image on the screen of the display panel 81 as the processing in a step S1.

Next, as the processing in a step S2, the control/computation unit 72 performs the previously discussed array conversion process on imaging data supplied from the image sensor of the camera module 1, and additionally, as the processing in a step S3, executes the previously discussed signal processing in viewfinder mode using the array-converted imaging data.

Next, as the processing in a step S4, the control/computation unit 72 determines whether or not ON instructions for a shutter button for imaging have been input from the user via an operation on the key operation unit 90 or the touch panel 86, for example. The control/computation unit 72 then returns the process to step S2 while ON instructions for a shutter button for imaging have not been input, and advances the process to a step S5 upon determining that ON instructions for a shutter button for imaging have been input.

Upon advancing to the processing in step S5, the control/computation unit 72 switches to capture mode, and also suspends the array conversion process as the processing in a step S6.

Next, as the processing in a step S7, the control/computation unit 72 executes signal processing in capture mode after switching thereto.

Then, the control/computation unit 72 determines in a step S8 if image capture has completed, returning the process to step S7 while it is not completed, and advancing the process to a step S9 when it is completed.

Upon advancing to the processing in step S9, the user is asked whether or not to save the captured image data, for example, and when instructions for saving are input, the capture image data is saved to the high-capacity memory for data storage, for example.

Subsequently, the control/computation unit 72 returns the process to step S1 and switches to viewfinder mode, i.e. an imaging standby state.

Meanwhile, during the viewfinder image processing in step S3 of FIG. 17 in the case of an imaging signal processing program in accordance with the second embodiment of the present disclosure, imaging data from three adjacent areas corresponding to R, G, and B, are used, for example, and a viewfinder image is generated by combining those three sets of imaging data after conducting color gain correction using AWB data given by the first camera ISP 18V and a parallax correction processing, as discussed earlier.

Also, in the case of the second embodiment, in the capture image processing of step S8, a capture image consisting of a plurality of identical images obtained from the respective areas discussed earlier is generated, and the capture image is saved in step S9.

CONCLUSION (1) An imaging apparatus of an embodiment of the present disclosure includes a sensor unit including a plurality of sensor arrays that that output first imaging data formed by an optical system; an array converter that generates second imaging data by converting the first imaging data output by the sensor unit into an order corresponding to a predetermined arrangement; a first signal processor that performs first signal processing on the second imaging data output by the array converter; and a second signal processor that performs second signal processing on the first imaging data output by the sensor unit.

(2) The information processing apparatus of (1), further comprising: a display, wherein the first signal processing performed by the first signal processor includes generating a viewfinder image to be displayed on the display based on the second imaging data output by the sensor unit.

(3) The information processing apparatus of (1) or (2), wherein the second signal processing performed by the second signal processor includes generating a captured image based on the first imaging data output by the sensor unit.

(4) The information processing apparatus of any one of (1) to (3), wherein the first signal processing performed by the first signal processor includes executing a predetermined image analysis processing on the second imaging data output by the array converter.

(5) The information processing apparatus of any one of (1) to (4), wherein the second signal processing performed by the second signal processor includes at least one of generating a viewfinder image to be displayed on a display and generating a captured image based on the first imaging data output by the sensor unit.

(6) The information processing apparatus of any one of (1) to (5), wherein the sensor unit includes a three-chip image sensor respectively corresponding to the three primary colors red, green, and blue.

(7) The information processing apparatus of (6), wherein the optical system separates incident light into respective red, green, and blue color components and forms images on the three respectively corresponding image sensors of the three-chip image sensor.

(8) The information processing apparatus of any one of (1) to (7), wherein the sensor unit includes a one-chip image sensor plane divided into a plurality of individual areas of a predetermined size including of groups of several pixels each.

(9) The information processing apparatus of any one of (1) to (8), wherein the optical system includes a microlens array.

(10) The information processing apparatus of (8), wherein the optical system includes a microlens array in which microlenses are respectively disposed in correspondence with the individual areas of the image sensor, such that by passing incident light through the microlens array, substantially identical images are respectively formed in the individual areas by the microlenses constituting the microlens array.

(11) The information processing apparatus of (10), wherein the second signal processing performed by the second signal processor includes generating a viewfinder image to be displayed on a display based on a plurality of substantially identical images formed in a subset of the individual areas.

(12) The information processing apparatus of (10), wherein the second signal processing performed by the second signal processor includes generating a capture image based on a plurality of substantially identical images formed in all of the areas.

(13) The information processing apparatus of any one of (1) to (12), wherein respective areas of the sensor unit are associated with one of the primary colors red, green, and blue, and from among the areas respectively associated with one of the red, green, and blue color components of the sensor unit, the array converter rearranges imaging data output from adjacent areas corresponding to red, green, and blue into the second imaging data in the order corresponding to the predetermined arrangement.

(14) The information processing apparatus of any one of (1) to (13), wherein the array converter includes a counter that counts a clock expressing timings at which the sensor unit is to output imaging data.

(15) The information processing apparatus of (14), wherein the array converter generates a select signal for selecting imaging data in the order corresponding to the predetermined arrangement from among the imaging data for a plurality of substantially identical images output by the sensor unit.

(16) The information processing apparatus of (15), wherein the array converter includes a selector that selects imaging data in the order corresponding to the predetermined arrangement from among the imaging data for a plurality of substantially identical images output by the sensor unit according to the select signal generated by the counter.

(17) The information processing apparatus of any one of (1) to (16), further comprising: a mode switching controller that switches between a first mode in which image data generated by the first signal processor is output by the first signal processor, and a second mode in which image generated by the second signal processor is output by the second signal processor, wherein while in the first mode, the mode switching controller causes the array converter to generate imaging data in the order corresponding to the predetermined arrangement from the imaging data for a plurality of substantially identical images.

(18) An information processing method performed by an information processing apparatus, the method comprising: outputting, by a sensor unit including a plurality of sensor arrays, first imaging data formed by an optical system; generating second imaging data by converting the first imaging data output by the sensor unit into an order corresponding to a predetermined arrangement; performing, by a first signal processor, first signal processing on the second imaging data; and performing, by a second signal processor, second signal processing on the first imaging data.

(19) A non-transitory computer-readable medium including computer program instructions, which when executed by an information processing apparatus, cause the information processing apparatus to perform a method, the method comprising: outputting, by a sensor unit including a plurality of sensor arrays, first imaging data formed by an optical system; generating second imaging data by converting the first imaging data output by the sensor unit into an order corresponding to a predetermined arrangement; performing, by a first signal processor, first signal processing on the second imaging data; and performing, by a second signal processor, second signal processing on the first imaging data.

As described in the foregoing, an imaging apparatus in accordance with an embodiment of the present disclosure enables signal processing of imaging data output in a given order, while also enabling signal processing of a plurality of identical images formed due to incident light from a subject passing through an optical system. Thus, according to an imaging apparatus of an embodiment of the present disclosure, it is possible to ease software design and modification, shorten the development period, and curtail rises in costs in the development of new products.

However, an imaging apparatus of the present embodiments is also applicable to various information devices, such as high-performance mobile phones, tablet devices, and slate PCs, for example, as well as so-called personal digital assistants (PDAs), notebook computers, portable game consoles, and portable navigation devices, etc., as long as the device is provided with the camera functions discussed above.

Also, the descriptions of the embodiments discussed above are examples of the present disclosure. For this reason, the present disclosure is not limited to the embodiments discussed above, and various modifications depending on the design, etc. are obviously possible within a scope that does not depart from the technical ideas in accordance with the present disclosure.

Moreover, it should be understood as obvious by those skilled in the art that various alterations, combinations, and other embodiments may occur depending on design or other factors insofar as they are within the scope of the claims of the present disclosure or the equivalents thereof.

The invention claimed is:

1. An information processing apparatus comprising:
a sensor unit including a plurality of sensor arrays that output first imaging data formed by an optical system; and
circuitry configured to
generate second imaging data by converting the first imaging data output by the sensor unit into an order corresponding to a predetermined arrangement;
perform first signal processing on the second imaging data to generate a viewfinder image having a first resolution;
perform second signal processing on the first imaging data to generate a captured image having a second resolution that is greater than the first resolution; and
suspend generating the second imaging data upon receiving an input to generate the captured image.

2. The information processing apparatus of claim 1, further comprising:
a display, wherein
the first signal processing performed by the circuitry includes generating the viewfinder image to be displayed on the display based on the second imaging data.

3. The information processing apparatus of claim 1, wherein
the second signal processing performed by the circuitry includes generating the captured image based on the first imaging data.

4. The information processing apparatus of claim 1, wherein
the first signal processing performed by the circuitry includes executing a predetermined image analysis processing on the second imaging data.

5. The information processing apparatus of claim 1, wherein
the sensor unit includes a three-chip image sensor respectively corresponding to the three primary colors red, green, and blue.

6. The information processing apparatus of claim 5, wherein
the optical system separates incident light into respective red, green, and blue color components and forms images on the three respectively corresponding image sensors of the three-chip image sensor.

7. The information processing apparatus of claim 1, wherein
the sensor unit includes a one-chip image sensor plane divided into a plurality of individual areas of a predetermined size including of groups of several pixels each.

8. The information processing apparatus of claim 1, wherein
the optical system includes a microlens array.

9. The information processing apparatus of claim 7, wherein
the optical system includes a microlens array in which microlenses are respectively disposed in correspondence with the individual areas of the image sensor, such that by passing incident light through the microlens array, substantially identical images are respectively formed in the individual areas by the microlenses constituting the microlens array.

10. The information processing apparatus of claim 9, wherein
the second signal processing performed by the circuitry includes generating the captured image based on a plurality of substantially identical images formed in all of the areas.

11. The information processing apparatus of claim 1, wherein
respective areas of the sensor unit are associated with one of the primary colors red, green, and blue, and from among the areas respectively associated with one of the red, green, and blue color components of the sensor unit, the circuitry is configured to rearrange imaging data output from adjacent areas corresponding to red, green, and blue into the second imaging data in the order corresponding to the predetermined arrangement.

12. The information processing apparatus of claim 1, wherein
the circuitry is configured to count a clock expressing timings at which the sensor unit is to output imaging data.

13. The information processing apparatus of claim 12, wherein
the circuitry is configured to generate a select signal for selecting imaging data in the order corresponding to the predetermined arrangement from among the imaging data for a plurality of substantially identical images output by the sensor unit.

14. The information processing apparatus of claim 13, wherein
the circuitry is configured to select imaging data in the order corresponding to the predetermined arrangement from among the imaging data for a plurality of substantially identical images output by the sensor unit according to the select signal.

15. An information processing method performed by an information processing apparatus, the method comprising:
outputting, by a sensor unit including a plurality of sensor arrays, first imaging data formed by an optical system;
generating second imaging data by converting the first imaging data output by the sensor unit into an order corresponding to a predetermined arrangement;
performing, by circuitry of the information processing apparatus, first signal processing on the second imaging data to generate a viewfinder image having a first resolution;
performing, by the circuitry, second signal processing on the first imaging data to generate a captured image having a second resolution that is greater than the first resolution; and
suspending generating the second image data upon receiving an input to generate the captured image data.

16. A non-transitory computer-readable medium including computer program instructions, which when executed by an information processing apparatus, cause the information processing apparatus to perform a method, the method comprising:
outputting, by a sensor unit including a plurality of sensor arrays, first imaging data formed by an optical system;
generating second imaging data by converting the first imaging data output by the sensor unit into an order corresponding to a predetermined arrangement;
performing, by circuitry of the information processing apparatus, first signal processing on the second imaging data to generate a viewfinder image having a first resolution;
performing, by the circuitry, second signal processing on the first imaging data to generate a captured image having a second resolution that is greater than the first resolution; and
suspending generating the second image data upon receiving an input to generate the captured image data.

* * * * *